(12) United States Patent
Boudreaux et al.

(10) Patent No.: US 7,811,618 B2
(45) Date of Patent: Oct. 12, 2010

(54) METHOD FOR REDUCING ASPARAGINE IN FOOD PRODUCTS

(75) Inventors: Eric Boudreaux, Dallas, TX (US); Pravin Maganlal Desai, Carrollton, TX (US); Vincent Allen Elder, Carrollton, TX (US); John Gregory Fulcher, Dallas, TX (US); Ponnattu Kurian Joseph, Irving, TX (US); Wu Li, Plano, TX (US); V.N. Mohan Rao, Plano, TX (US); Michael Grant Topor, Little Elm, TX (US); Gerald Vogel, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 880 days.

(21) Appl. No.: 11/627,810

(22) Filed: Jan. 26, 2007

(65) Prior Publication Data
US 2007/0141227 A1   Jun. 21, 2007

Related U.S. Application Data

(63) Continuation-in-part of application No. 10/371,448, filed on Feb. 21, 2003, now Pat. No. 7,393,550, and a continuation-in-part of application No. 11/344,992, filed on Feb. 1, 2006, which is a continuation of application No. 10/247,504, filed on Sep. 19, 2002, now Pat. No. 7,037,540.

(51) Int. Cl.
  *A23L 1/216* (2006.01)
(52) U.S. Cl. .................. 426/438; 426/425; 426/431
(58) Field of Classification Search ............ 426/438, 426/425, 431
See application file for complete search history.

(56) References Cited

U.S. PATENT DOCUMENTS 1,053 A    12/1838  Hatfield (Continued)

FOREIGN PATENT DOCUMENTS

CL    403-2002    6/2003

(Continued)

OTHER PUBLICATIONS

M.Y. Jung, D.S. Choi, J.W. JU; "A Novel Technique for Limitation of Acrylamide Formation in Fried and Baked Corn Chips and in French Fries", Journal of Food Science 1287-1290, vol. 68, Nr. 4, 2003.

(Continued)

*Primary Examiner*—Anthony Weier
(74) *Attorney, Agent, or Firm*—Colin P. Cahoon; Chad E. Walter; Carstens & Cahoon, LLP

(57) ABSTRACT

A method for reducing the amount of asparagine, a pre-cursor of acrylamide, in food products that are thermally processed. This invention permits the production of foods having significantly reduced levels of acrylamide. The method relies on contacting a potato feed such as potato slices containing asparagine, an acrylamide pre-cursor, with a leaching solution to extract asparagine out of the potato feed. Thermally processing the leached potatoes will result in a potato product having a lower level of acrylamide than a non-leached, thermally processed potato product.

38 Claims, 12 Drawing Sheets

U.S. PATENT DOCUMENTS

| | | |
|---|---|---|
| 1,132,296 A | 3/1915 | Anspach |
| 1,782,960 A | 11/1930 | Erysin |
| 2,448,152 A | 8/1948 | Patton |
| 2,490,431 A | 12/1949 | Greene et al. |
| 2,487,924 A | 2/1950 | Baxter |
| 2,584,893 A | 2/1952 | Lloyd |
| 2,611,705 A | 9/1952 | Hendel |
| 2,704,257 A | 3/1955 | Sollano et al. |
| 2,744,017 A | 5/1956 | Baldwin |
| 2,759,832 A | 8/1956 | Cording et al. |
| 2,762,709 A | 9/1956 | Janis |
| 2,780,552 A | 2/1957 | Willard, Jr. et al. |
| 2,879,264 A * | 3/1959 | Xander et al. ............ 530/370 |
| 2,893,878 A | 7/1959 | Simon |
| 2,910,367 A | 10/1959 | Melnick |
| 2,905,559 A | 11/1959 | Anderson et al. |
| 2,987,401 A | 6/1961 | Johnston |
| 3,026,885 A | 3/1962 | Eytinge |
| 3,027,258 A | 3/1962 | Markakis |
| 3,038,810 A | 6/1962 | Akerboom |
| 3,044,880 A | 7/1962 | Bogyo |
| 3,085,020 A | 4/1963 | Backinger et al. |
| 3,197,866 A | 8/1965 | Barron |
| 3,219,458 A | 11/1965 | Higby |
| 3,278,311 A | 10/1966 | Brown |
| 3,305,366 A | 2/1967 | Sutton |
| 3,359,123 A | 12/1967 | Katucki |
| 3,369,908 A | 2/1968 | Gonzalez et al. |
| 3,404,986 A | 10/1968 | Wimmer |
| 3,436,229 A | 4/1969 | Simpson |
| 3,545,979 A | 12/1970 | Ghafoori |
| 3,578,463 A | 5/1971 | Smith |
| 3,608,728 A | 9/1971 | Trimble |
| 3,620,925 A | 11/1971 | Mochizuki et al. |
| 3,627,535 A | 12/1971 | Davidson |
| 3,634,095 A | 1/1972 | Willard |
| 3,652,402 A | 3/1972 | Chibata et al. |
| 3,687,679 A | 8/1972 | Sijbring |
| 3,690,895 A | 9/1972 | Amadon et al. |
| 3,725,087 A | 4/1973 | Miller |
| 3,773,624 A | 11/1973 | Wagner et al. |
| 3,782,973 A | 1/1974 | Pittet |
| 3,812,775 A | 5/1974 | Sijbring |
| 3,914,436 A | 10/1975 | Nakadai et al. |
| 3,917,866 A | 11/1975 | Purves |
| 3,925,568 A | 12/1975 | Rao |
| 3,987,210 A | 10/1976 | Cremer |
| 3,997,684 A | 12/1976 | Willard |
| 3,998,975 A | 12/1976 | Liepa |
| 4,005,225 A | 1/1977 | Craig |
| 4,073,952 A | 2/1978 | Standing |
| 4,084,008 A | 4/1978 | Yueh |
| 4,122,198 A | 10/1978 | Wisdom |
| 4,124,727 A | 11/1978 | Rockland |
| 4,136,208 A | 1/1979 | Light et al. |
| 4,140,801 A | 2/1979 | Hilton |
| 4,167,137 A | 9/1979 | van Remmen |
| 4,192,773 A | 3/1980 | Yoshikawa et al. |
| 4,199,612 A | 4/1980 | Fragas |
| 4,210,594 A | 7/1980 | Logan et al. |
| 4,272,554 A | 6/1981 | Schroeder et al. |
| 4,277,510 A | 7/1981 | Wicklund |
| 4,312,892 A | 1/1982 | Rubio |
| 4,317,742 A | 3/1982 | Yamaji et al. |
| 4,418,088 A | 11/1983 | Cantenot |
| 4,461,832 A | 7/1984 | Tschang |
| 4,537,786 A | 8/1985 | Bernard |
| 4,555,409 A | 11/1985 | Hart |
| 4,582,927 A | 4/1986 | Fulcher |
| 4,594,260 A | 6/1986 | Vaqueiro |
| 4,595,597 A | 6/1986 | Lenchin et al. |
| 4,645,679 A | 2/1987 | Lee |
| 4,673,581 A | 6/1987 | Fulcher |
| 4,706,556 A | 11/1987 | Wallace |
| 4,721,625 A | 1/1988 | Lee |
| 4,749,579 A | 6/1988 | Haydock |
| 4,751,093 A | 6/1988 | Hong |
| 4,806,377 A | 2/1989 | Ellis |
| 4,844,930 A | 7/1989 | Mottur |
| 4,844,931 A | 7/1989 | Webb |
| 4,863,750 A | 9/1989 | Pawlak |
| 4,884,780 A | 12/1989 | Ohashi |
| 4,889,733 A | 12/1989 | Willard |
| 4,900,576 A | 2/1990 | Bonnett |
| 4,917,909 A | 4/1990 | Prosise |
| 4,931,296 A | 6/1990 | Shanbhag |
| 4,933,199 A | 6/1990 | Neel |
| 4,937,085 A | 6/1990 | Cherry |
| 4,963,373 A | 10/1990 | Fan et al. |
| 4,966,782 A | 10/1990 | Heidolph et al. |
| 4,971,813 A | 11/1990 | Strobel |
| 4,978,684 A | 12/1990 | Cerami |
| 4,985,269 A | 1/1991 | Irvin et al. |
| 5,002,784 A | 3/1991 | Pare |
| 5,009,903 A | 4/1991 | deFigueiredo et al. |
| 5,035,904 A | 7/1991 | Huang |
| 5,045,335 A | 9/1991 | De Rooij et al. |
| 5,071,661 A | 12/1991 | Stubbs |
| 5,087,467 A | 2/1992 | Schwank |
| 5,126,153 A | 6/1992 | Beck |
| 5,134,263 A | 7/1992 | Smith |
| 5,167,975 A | 12/1992 | Tsurumaki |
| 5,176,933 A | 1/1993 | Fulcher |
| 5,196,225 A | 3/1993 | Lush |
| 5,279,840 A | 1/1994 | Baisier et al. |
| 5,292,542 A | 3/1994 | Beck |
| 5,298,274 A | 3/1994 | Khalsa |
| 5,356,646 A | 10/1994 | Simic-Glavaski et al. |
| 5,362,511 A | 11/1994 | Villagran |
| 5,368,879 A | 11/1994 | White |
| 5,370,898 A | 12/1994 | Zussman |
| 5,389,389 A | 2/1995 | Beck |
| 5,391,384 A | 2/1995 | Mazza |
| 5,391,385 A | 2/1995 | Seybold |
| 5,393,543 A | 2/1995 | Laufer |
| 5,394,790 A | 3/1995 | Smith |
| 5,441,758 A | 8/1995 | Lewis |
| 5,447,742 A | 9/1995 | Malvido |
| 5,458,903 A | 10/1995 | Colson |
| 5,464,642 A | 11/1995 | Villagran et al. |
| 5,464,643 A | 11/1995 | Lodge et al. |
| 5,505,978 A | 4/1996 | Roy |
| 5,514,387 A | 5/1996 | Zimmerman et al. |
| 5,534,280 A | 7/1996 | Welch |
| 5,554,405 A | 9/1996 | Fazzolare |
| 5,558,886 A | 9/1996 | Martinez-Bustos et al. |
| 5,589,213 A | 12/1996 | Desai |
| 5,603,972 A | 2/1997 | McFarland |
| 5,603,973 A | 2/1997 | Benson |
| 5,620,727 A | 4/1997 | Gerrish et al. |
| 5,676,042 A | 10/1997 | Sakuma |
| 5,690,982 A | 11/1997 | Fazzolare |
| 5,695,804 A | 12/1997 | Hnat |
| 5,707,671 A | 1/1998 | Beck |
| 5,747,084 A | 5/1998 | Cochran |
| 5,792,499 A | 8/1998 | Atwell |
| 5,846,589 A | 12/1998 | Baker |
| 5,858,431 A | 1/1999 | Wiedersatz |
| 5,919,691 A | 7/1999 | Schulein |
| 5,945,146 A | 8/1999 | Twinam |
| 5,947,010 A | 9/1999 | Barry |
| 5,972,367 A | 10/1999 | Inoue |
| 5,972,397 A | 10/1999 | Durance |
| 6,001,409 A | 12/1999 | Gimmler |

| | | | | | | |
|---|---|---|---|---|---|---|
| 6,016,096 | A | 1/2000 | Barnes | 2004/0180129 A1 | 9/2004 | Plank et al. |
| 6,025,011 | A | 2/2000 | Wilkinson | 2004/0197012 A1 | 10/2004 | Bourg |
| 6,033,707 | A | 3/2000 | Lanner | 2004/0224066 A1 | 11/2004 | Lindsay et al. |
| 6,039,978 | A | 3/2000 | Bangs et al. | 2004/0265429 A1 | 12/2004 | Teras et al. |
| 6,066,353 | A | 5/2000 | Villagran et al. | 2004/0265432 A1 | 12/2004 | Howie et al. |
| 6,068,872 | A | 5/2000 | Hashiguchi | 2005/0064084 A1 | 3/2005 | Elder |
| 6,068,873 | A | 5/2000 | Delrue et al. | 2005/0074538 A1 | 4/2005 | Elder |
| RE36,785 | E | 7/2000 | Colson | 2005/0079254 A1 | 4/2005 | Corrigan |
| 6,139,884 | A | 10/2000 | Shifferaw | 2005/0118322 A1 | 6/2005 | Elder |
| 6,159,530 | A | 12/2000 | Christiansen et al. | 2005/0152811 A1 | 7/2005 | Taylor |
| 6,207,204 | B1 | 3/2001 | Christiansen | 2005/0196504 A1 | 9/2005 | Finley |
| 6,210,720 | B1 | 4/2001 | Leusner et al. | 2005/0214411 A1 | 9/2005 | Lindsay |
| 6,227,421 | B1 | 5/2001 | Richard | 2006/0088633 A1 | 4/2006 | Barber |
| 6,287,672 | B1 | 9/2001 | Fields et al. | 2006/0110503 A1 | 5/2006 | Bates |
| 6,290,999 | B1 | 9/2001 | Gerrish | 2006/0127534 A1 | 6/2006 | Elder |
| 6,299,914 | B1 | 10/2001 | Christiansen | 2006/0193964 A1 | 8/2006 | Eckhoff |
| 6,335,048 | B1 | 1/2002 | Swarvar | 2006/0210693 A1 | 9/2006 | Oftring |
| 6,358,544 | B1 | 3/2002 | Henry, Jr. | 2006/0216376 A1 | 9/2006 | Milici |
| 6,383,533 | B1 | 5/2002 | Soeda | 2006/0216388 A1 | 9/2006 | Christensen |
| 6,419,965 | B1 | 7/2002 | Douaire | 2007/0042080 A1 | 2/2007 | Plomp |
| 6,436,458 | B2 | 8/2002 | Kuechle | 2007/0087101 A1 | 4/2007 | Gusek |
| 6,521,871 | B1 | 2/2003 | Shelton | 2007/0141225 A1 | 6/2007 | Elder |
| 6,528,768 | B1 | 3/2003 | Simic-Glavaski et al. | 2007/0141226 A1 | 6/2007 | Elder |
| 6,531,174 | B2 | 3/2003 | Barrett et al. | 2007/0148318 A1 | 6/2007 | Rubio |
| 6,558,730 | B1 | 5/2003 | Gisaw | 2007/0166439 A1 | 7/2007 | Soe |
| 6,599,547 | B1 | 7/2003 | Martinez-Serna Villagran et al. | 2007/0178219 A1 | 8/2007 | Boudreaux |
| 6,607,777 | B1 | 8/2003 | Walsh et al. | 2007/0184175 A1 | 8/2007 | Rubio |
| 6,638,554 | B1 | 10/2003 | Rubio | 2007/0196556 A1 | 8/2007 | Van Der Meer |
| 6,638,558 | B2 | 10/2003 | Brubacher | 2007/0281062 A1 | 12/2007 | Bourg |
| 6,716,462 | B2 | 4/2004 | Prosise et al. | 2007/0292589 A1 | 12/2007 | Elder |
| 6,770,469 | B2 | 8/2004 | Yamaguchi | 2008/0003340 A1 | 1/2008 | Karwowski |
| 6,778,887 | B2 | 8/2004 | Britton | 2008/0008780 A1 | 1/2008 | Streekstra |
| 6,828,527 | B2 | 12/2004 | Simic-Glavaski | 2008/0138480 A1 | 6/2008 | Bows |
| 6,872,417 | B1 | 3/2005 | Freudenrich | 2008/0166450 A1 | 7/2008 | Corrigan |
| 6,896,528 | B2 | 5/2005 | Kubota | 2008/0166452 A1 | 7/2008 | Corrigan |
| 6,929,812 | B2 | 8/2005 | Van Der Doe | 2008/0279994 A1 | 11/2008 | Cantley |
| 6,989,167 | B2 | 1/2006 | Howie et al. | 2008/0299273 A1 | 12/2008 | Bhaskar |
| 7,037,540 | B2 | 5/2006 | Elder | 2009/0074915 A1 | 3/2009 | Hendriksen |
| 7,122,719 | B2 | 10/2006 | Hakimi | 2009/0098265 A1 | 4/2009 | Kock |
| 7,169,417 | B2 | 1/2007 | Dibble et al. | 2009/0191310 A1 | 7/2009 | Zyzak |
| 7,189,422 | B2 | 3/2007 | Howie | | | |
| 7,220,440 | B2 | 5/2007 | Dria | | | |
| 7,267,834 | B2 | 9/2007 | Elder | | | |
| 7,291,380 | B2 | 11/2007 | Nyholm | | | |
| 7,393,550 | B2 | 7/2008 | Barry | | | |
| 7,514,113 | B2 | 4/2009 | Zyzak | | | |
| 7,524,519 | B2 | 4/2009 | Zyzak | | | |
| 7,527,815 | B2 | 5/2009 | Teras | | | |
| 7,534,934 | B2 | 5/2009 | Rommens | | | |
| 2002/0018838 | A1 | 2/2002 | Zimmerman | | | |
| 2002/0025367 | A1 | 2/2002 | Koehler | | | |
| 2002/0129713 | A1 | 9/2002 | Caridis | | | |
| 2003/0049359 | A1 | 3/2003 | Kulkarni | | | |
| 2003/0155346 | A1 | 8/2003 | Simic-Glavaski et al. | | | |
| 2003/0183092 | A1 | 10/2003 | Barber et al. | | | |
| 2003/0198725 | A1 | 10/2003 | Cardenas | | | |
| 2003/0219518 | A1 | 11/2003 | Li | | | |
| 2004/0030468 | A1 | 2/2004 | Britton | | | |
| 2004/0047973 | A1 | 3/2004 | Bourhis et al. | | | |
| 2004/0058046 | A1 | 3/2004 | Zyzak | | | |
| 2004/0058054 | A1 | 3/2004 | Elder et al. | | | |
| 2004/0580456 | | 3/2004 | Elder et al. | | | |
| 2004/0081724 | A1 | 4/2004 | Dria et al. | | | |
| 2004/0086597 | A1 | 5/2004 | Awad | | | |
| 2004/0101607 | A1 | 5/2004 | Zyzak et al. | | | |
| 2004/0105929 | A1 | 6/2004 | Tomoda et al. | | | |
| 2004/0107455 | A1 | 6/2004 | Rommens et al. | | | |
| 2004/0109926 | A1 | 6/2004 | Tomoda et al. | | | |
| 2004/0115321 | A1 | 6/2004 | Tricoit et al. | | | |
| 2004/0126469 | A1 | 7/2004 | Tomoda et al. | | | |
| 2004/0166210 | A1 | 8/2004 | Barry et al. | | | |
| 2004/0166227 | A1 | 8/2004 | Elder et al. | | | |
| 2004/0180125 | A1 | 9/2004 | Plank et al. | | | |

FOREIGN PATENT DOCUMENTS

| | | | |
|---|---|---|---|
| EP | 1 419 702 A1 | | 5/2004 |
| EP | 1 419 703 A1 | | 5/2004 |
| ES | 2019044 | | 2/1990 |
| FR | 874453 | | 8/1942 |
| GB | 156905 | | 1/1921 |
| GB | 335 214 | | 9/1930 |
| GB | 1132296 | | 10/1968 |
| GB | 1519049 | | 7/1978 |
| JP | 68006927 | | 9/1965 |
| JP | 70009815 | | 10/1966 |
| JP | 57100179 | | 12/1980 |
| JP | 62-48351 | * | 3/1987 |
| JP | 4104753 | | 4/1992 |
| JP | 6030782 A | | 5/1994 |
| JP | 06169713 | | 6/1994 |
| JP | 2004-313183 | | 11/1994 |
| JP | 05123126 | | 5/1998 |
| JP | 10136883 | | 5/1998 |
| JP | 11056280 | | 3/1999 |
| JP | 11178536 | | 7/1999 |
| JP | 2004-180563 | | 7/2004 |
| JP | 2004-313183 | | 11/2004 |
| JP | 2005-278448 | | 10/2005 |
| RU | 2048512 | | 11/1995 |
| RU | 2078797 | | 5/1997 |
| RU | 2140927 | | 11/1999 |
| RU | 2216574 | | 11/2003 |
| SU | 1822863 | | 6/1993 |
| WO | 9111920 A1 | | 8/1991 |
| WO | 96/01572 | | 1/1996 |

| | | |
|---|---|---|
| WO | 00/04784 | 2/2000 |
| WO | 01/91581 | 12/2001 |
| WO | 01/91581 A2 | 12/2001 |
| WO | 2004/004484 A2 | 1/2004 |
| WO | 2004/026043 | 4/2004 |
| WO | 2004/028276 A2 | 4/2004 |
| WO | 2004/028277 A2 | 4/2004 |
| WO | 2004/028278 A2 | 4/2004 |
| WO | 2004/030468 A2 | 4/2004 |
| WO | 2004/032647 A1 | 4/2004 |
| WO | 2004/032648 A1 | 4/2004 |
| WO | 2004/039174 A1 | 5/2004 |
| WO | 2004/040999 A1 | 5/2004 |
| WO | 2004/047559 A1 | 6/2004 |
| WO | 2004/060078 A1 | 7/2004 |
| WO | 2004/080205 A1 | 9/2004 |
| WO | 2007/106996 | 9/2007 |

OTHER PUBLICATIONS

Pedreschi, Franco, et al.; "Reduction of Acrylamide Formation in Potato Slices During Frying", 2004 Swiss Society of Food Science and technology; published by Elsevier Ltd., Jan. 20, 2004.

De Meulenaer, Bruno, et al.; "Comparison of Potato Varieties Between Seasons and Their Potential for Acrylamide Formation", 2007 Society of Chemical Industry. Journal of the Science of Food and Agriculture, Dec. 6, 2006.

Ou, Shiyi, et al.; "Reduction of Acrylamide Formation by Selected Agents in Fried Potato Crisps on Industrial Scale", ScienceDirect, Innovative Food Science and Emerging Technologies 9 (2008) 116-121; Published by Elsevier Ltd., Jul. 19, 2006.

Al Viklund, Gunilla, et al.; "Variety and Storage Conditions Affect the Precursor Content and Amount of Acrylamide in Potato Crisps", 2007 Society of Chemical Industry, Journal of the Science of Food and Agriculture, Dec. 22, 2006.

Williams, J.S.E.; Influence of Variety and Processing Conditions on Acrylamide Levels in Fried Potato Crisps; Food Chemistry 90 (2005) 875-881.

Fiselier, K; Grob, K; Pfefferle, A.; Brown potato Croquettes Low in Acrylamide by Coating with Egg/Breadcrumbs; Eur Food Res. Technol (2004) 219:111-115.

Brathen, Erland; et al.; Addition of Glycine Reduces the Content of Acrylamide in Cereal and Potato Products; J. Agric. Food Chem. 2005, 53, 3259-3264.

Gokmen, Vural, et al. Acrylamide formation is prevented by divalent cations during the Maillard reaction; Food Chemistry (2006) doi: 10.1016/j.foodchem.Aug. 11, 2006.

May, N.J., et al; Acrylamide formation in deep-fried potato products and removal of acrylamide precursors, Food Australia 50 (10)-pp. 488-493, Oct. 1, 2006.

Mizukami, Yuzo, et al.; Analysis of Acrylamide in Green Tea by Gas Chromatography—Mass Spectrometry; J. Agric. Food Chem. 2006, 54, 7370-7377.

Low, Mei Yin, et al.; Effect of Citric Acid and Glycine Addition on Acrylamide and Flavor in a Potato Model System; J. Agric. Food Chem. 2006, 54, 5976-5983.

Ishihara, Katsuyuki; Examination of Conditions inhibiting the Formation of Acrylamide in the Model System of Fried Potato; Biosci. Biotechnol. Biochem., 70(7), 1616-1621, 2006.

De Vleeschouwer, Kristel; Impact of pH on the Kinetics of Acrylamide Formation/Elimination Reactions in Model Systems, J. Agric. Food Chem. 2006, 54, 7847-7855.

Amrein, Thomas; Influence of Thermal Processing Conditions on Acrylamide Generation and Browning in a Potato Model System, J. Agric. Food Chem. 2006, 54, 5910-5916.

Fan, Xuetong, et al.; Effectiveness of Ionizing Radiation in Reducing Furan and Acrylamide Levels in Foods; J. Agric. Food Chem. 2006, 54, 8266-8270.

Pedreschi, Franco: Color kinetics and acrylamide formation in NaCl soaked potato chips; ScienceDirect Journal of Food Engineering 79 (2007) 989-997.

Pedreschi, Franco, et al: Color development and acrylamide content of pre-dried potato chips; ScienceDirect Journal of Food Engineering 79 (2007) 786-793.

Pedreschi, Franco, et al.: Acrylamide reduction under different pre-treatments in French fries; ScienceDirect Journal of Food Engineering 79 (2007) 1287-1294.

Granda, C., et al; "Reduction of Acrylamide Formation in Potato Chips by Low-temperature Vacuum Frying", Journal of Food Science E405, vol. 69, Nr. 8, 2004, Oct. 7, 2004.

Granda, Claudia, et al; "Effect of Raw Potato Composition on Acrylamide Formation in Potato Chips", Journal of Food Science E519, vol. 70, Nr. 9, 2005, Nov. 16, 2005.

Garayo, Jagoba, et al; "Vacuum frying of potato chips", Journal of Food Engineering 55 (2002) 181-191.

Granda, Claudia, et al; "Kinetics of Acrylamide Formation During Traditional and Vacuum Frying of Potato Chips", Journal of Food Process Engineering 28 (2005) 478-493.

Claeys, Wendie L., et al; "Quantifying the formation of carcinogens during food processing: acrylamide", Trends in Food Science & Technology 16, 181-193, 2005.

U.S. Department of Health & Human Services article entitled, "Exploratory Data on Acrylamide in Foods," found at http://www.mindfully.org/food/acrylamide-foods-fda, Dec. 4, 2002.

Don Mottram—The University of Reading, "Acrylamide in Cooked Foods—the Latest "Food Scare"", 2002.

Report from Swedish Scientific Expert Committee of the Swedish National Food Administration, "Acrylamide in Food—Mechanisms of Formation and Influencing Factors During Heating of Foods", Apr. 24, 2002.

Amanda Yarnell, Chemical & Engineering News article entitled "Acrylamide Mystery Solved", found at http://pubs.acs.org/cen/today/oct4.html, Oct. 4, 2002.

Janet Raloff, Science News Online article entitled "Hot Spuds: Golden Path to Acrylamide in Food", found at http://www.sciencenews.org/20021005/fob5.asp, Week of Oct. 5, 2002, vol. 162.

Lauran Neergaard, Health Zone article entitled "Scientists: Chemical Reaction May Create Carcinogen", found at http://www.cjonline.com/stories/093002/hea_carcinogen.shtml, Sep. 30, 2002.

Procter & Gamble article entitled "New Findings Show Acrylamides Are Found in a Wider Variety of Foods and May Lead to New Ways of Reducing Acrylamide Levels" found at http://biz.yahoo.com/prnews/020927/clf005_1.html, Sep. 27, 2002.

Center for Science in the Public Interest article entitled "New Tests Confirm Acrylamide in American Foods", found at http://www.cspinet.org/new/200206251.html, Jun. 25, 2002.

World Health Organization Deptartment of Food Safety Report "FAO/WHO Consultation on the Health Implications of Acrylamide in Food", Joint FAO/WHO Consulation, Geneva, Jun. 25-27, 2002 found at http://www.who.int/fsf/Acrylamide/SummaryreportFinal.pdf.

U. S. Department of Health and Human Services, Public Health Service, National Toxicology Program, 9th Report on Carcinogens Revised Jan. 2001 found at http://win2000.kreatiweb.it/sanitaweb/web/Biblioteca/carcinogens/rahc/acrylamide.pdf.

Lindsay Murray, "Acrylamide", found at http://www.inchem.org/documents/pims/chemical/pim652.htm, Jun. 1998.

Centre for Molecular and Biomolecular Informatics article entitled "An Amino Acid Bedtime Story", found at http://www.cmbi.kun.nl.gvteach/HAN/alg/infopages/bedtime.html, material from Friedli Enterprises, Georges-Louis Friedli, PgDip., MSc.,PhD., Apr. 18, 2000.

Home Page for Frostburg State University—Organic Chemistry Help, article entitled "Nucleophilic Addition to Carbonyl Groups" found at http://www.chemhelper.com/nucadd.html, 2000.

Karl Harrison, article entitled "Amino Acids and Proteins" found at http://www.chem.ox.ac.uk/mom/amino_acids/introduction.html, 1996.

Karl Harrison, article entitled "Molecules of the Month", found at http://www.chem.ox.ac.uk/mom/, 1996.

Eur. J. Lipid Sci. Technol. 104 (2002) 762-771 article entitled "Analysis of acrylamide and mechanisms of its formation in deep-fried products" dated Sep. 27, 2002.

Nature magazine article entitled "Acrylamide is formed in the Maillard reaction" dated Oct. 3, 2002, which can be found at www.nature.com/nature.

Deutsche Lebensmittel-Rundschau 98 Jahrgang, Heft article entitled "Formation of Acrylamide in Heated Potato Products—Model Experiments Pointing to Asparagine as Precursor" dated Nov. 2002.

C. Benedito De Barber, J.A. Prieto, C. Collar, "Reversed-Phase High-Performance Liquid Chromatography Analysis of Changes in Free Amino Acids During Wheat Bread Dough Fermentation", Cereal Chemistry, Feb. 26, 1989, pp. 283-288, vol. 66, No. 4, American As.

Patricia C. Dunlop, Gail M. Meyer, Robert J. Roon, "Nitrogen Catabolite Repression of Asparaginase II in *Saccharomyces cerevisiae*", Journal of Bacteriology, Jul. 1980, pp. 422-426, vol. 143, No. 1, Department of Biochemistry, University of Minnesota, Minn.

Varoujan A. Yaylayan, Andrzej Wnorowski, Carolina Perez Locas, "Why Asparagine Needs Carbohydrates to Generate Acrylamide", Journal of Agricultural and Food Chemistry, Feb. 11, 2003, pp. 1753-1757, vol. 51, Dept. of Food Science and Agricultural Chemistry.

Adam Becalski, Benjamin P.-Y. Lau, David Lewis, and Stephen W. Seaman, "Acrylamide in Foods: Occurrence, Sources, and Modeling", Journal of Agricultural and Food Chemistry, 2003, pp. 802-808, vol. 51, American Chemical Society, USA.

Mendel Friedman, "Chemistry, BioChemistry, and Safety of Acrylamide. A Review", Journal of Agricultural and Food Chemistry, Jul. 3, 2003, pp. 4504-4526, vol. 51 (16), American Chemical Society, Western Regional Research Center, Albany, CA.

Agnieszka Kits, Erland Brathen, Svein Halvor Knutsen, Trude Wicklund, "Effective Ways of Decreasing Acrylamide Content in Potato Crisps During Processing", Journal of Agricultural and Food Chemistry, Oct. 15, 2004, pp. 7011-7016, vol. 52, American Chemical Society, USA.

David V. Zyzak et al., "Acrylamide Formation Mechanism in Heated Foods" Journal of Agricultural and Food Chemistry, Jun. 28, 2003, pp. 4782-4787, vol. 51, American Chemical Society, USA.

Dr. Jacques Olivier Bosset, et al., "Mitteilungen aus Lebensmitteluntersuchung und Hygiene", Jun. 2002, vol. 93, Offizielles Organ der Schweizerischen Gesellschaft fur Lebensmittel-und Umweltchemie und der Schweizerischen Gesellschaft fur Lebensmittelhygiene.

Kim et al., "Asparaginase II of *Saccharomyces cerevisiae*", The Journal of Biological Chemistry, 263 (24): 11948-11953, 1988.

Talburt & Smith: "Potato Processing"; 4th Edition. 1987, pp. 535-555.

Watson, S.A.; "Corn: Chemistry and Technology"; American Association of Cereal Chemists, 1987; pp. 410-420.

Biederman, Marcus, et al; "Experiments on Acrylamide Formation and Possibilities to Decrease the Potential of Acrylamide Formation in Potatoes" Official Food Control Authority of the Canton of Zurich.

Biedermann, Maurus, et al. "Methods for Determining the Potential of Acrylamide Formation and its Elimination in Raw Materials for Food Preparation, Such as Potatoes"; Official Food Control Authority of the Canton of Zurich.

Nielsen, Monk; "Enzyme Technology for Production of Protein Based Flavours"; Novo Nordisk; 1995.

www.foodstandards.gov.uk; Food Standards Agency "Study of Acrylamide in Food Background Information and Research Findings"; Press Briefing May 17, 2002.

European Commission; Health and Consumer Protection Directorate—General; "Opinion of the Scientific Committee on Food on new findings regarding the presence of acrylamide in food"; Jul. 3, 2002.

Institute of Food Science & Technology (UK); "Additional Research on Acrylamide in Food Essential; Scientists Declare"; Joint Press Release FAO/WHO/51; Jun. 27, 2002.

Tareke, Eden, et al.; "Analysis of Acrylamide, a Carcinogen Formed in Heated Foodstuffs"; Journal of Agricultural and Food Chemistry, pp. A-1.

Sanders, R.A., et al; "An LC/MS Acrylamide Method and Its Use in Investigating the Role of Asparagine".

James E. Lawrence, Acrylamide in Food, Health Canada, Sep. 11, 2002.

Browning prevention in fresh and dehydrated potatoes by SH-containing amino acids, Mendel Friedman, Ibolya Molnar-Perl and Derek R. Knighton; Food Additives and Contaminants, 1992, vol. 9, No. 5, 499-503.

Working Group 1: Mechanisms of Formation of Acrylamide in Food Summary Report.

Mustafa, Arwa; Andersson, Roger; Rosen, Johan; Kamal-Eldin, Afif; Aman, Per; Factors Influencing Acrylamide Content and Color in Rye Crisp Bread, J. Agric. Food Chem. 2005, 53, 5985-5989.

De Wilde, Tineke, et al., Influence of Fertilization on Acrylamide Formation during Frying of Potatoes Harvested in 2003, J. Agric. Food Chem 2006, 54, 404-408, Feb 2, 2006.

Vivanti, Vittorio; Finotti, Enrico; Friedman, Mendel; Level of Acrylamide Precursors Asparagine, Fructose, Glucose, and Sucrose in Potatoes Sold at Retail in Italy and in the United States; vol. 71, Nr. 2, 2006—Journal of Food Science C81-C85.

Fiselier, Katell; Hartmann, Annetta; Fiscalini, Alessandro; Grob, Koni; Higher Acrylamide Contents in French Fries Prepared from "Fresh" Prefabricates; Eur Food Res Technol (2005) 221:376-381.

Kim, Cheong Tae, Hwang, Eun-Sun; Lee, Hyong Joo; Reducing Acrylamide in Fried Snack Products by Adding Amino Acids; Journal of Food Science—vol. 70, NR. 5, 2005 C354-C358.

NFRI Report, published Jul. 1, 2004, Report on the symposium named "Chemistry and Safety of Acrylamide in Food" held by the Agricultural and Food Chemistry Division of the American Chemical Society held on Mar. 28-31, 2004 in Anaheim, CA, USA, published by the National Food Research Institute (NFRI) of the National Agricultural and Food Research Organization of Japan (NARO), available at http://oasys2.confex.com/acs/227nm/techprogram/D941.HTM.

Summary Report of "2004 Acrylamide in Food Workshop: Update—Scientific Issues, Uncertainties, and Research Strategies," held on Apr. 13-15, 2004 in Chicago, IL, USA, published on Aug. 6, 2004, by the National Food Research Institute (NFRI) of the National Agricultural and Food Research Organization of Japan (NARO), available at http://222.jifsan.umd.edu/docs/acry2004.

Abstracts of literature search, "Pathway from Asparagine to Acrylamide," 17 pages.

Abdel-Kader, Zakia M., "Effect of blanching on the diffusion of glucose from potatoes" (Abstract), Wiley InterScience Journals: Nahrung / Food vol. 36, Iss. 1, 1992, 1 page.

Associated Press Washington—"Habrian descubierto el origen de sustancia cancerigena en las papas fritas," Sep. 30, 2002, 2 pages.

Becalski, Adam, et al., "Acrylamide in French Fries: Influence of Free Amino Acids and Sugars," (Abstract), J. Agric. Food Chem. 52 (12), May 22, 2004, 1 page.

CBC News CBC.CA "Food sector told to cut down on toxins in chips, fries," Sep. 19, 2002, 2 pages.

CBC News CBC.CA "Scientists find route for toxin to form in fried, baked foods," Sep. 30, 2002, 3 pages.

CBC News CBC.CA "Some acrylamide with your fries?" Jan. 14, 2003, 6 pages.

Database WPI Week 199805 Thomson Scientific, London, GB; AN 1998-042903 XP002503379, Dec. 4, 1996, 1 page.

El Pais.com, "Hallada la reaccion quimica que produce la acrilamida en las frituras," Jul. 15, 2009, 1 page.

European Food Safety Authority, Report of "Workshop on Acrylamide Formation in Food," Nov. 17, 2003, Brussels, 22 pages.

Food Safety Consultations "Health Implications of Acrylamide in Food" Report of a Joint FAO/WHO Consultation, Geneva, Switzerland, Jun. 25-27, 2002, 38 pages.

Joint FAO/WHO Expert Commission on Food Additives, 64th Meeting, Rome, Feb. 8-17, 2005, 47 pages.

Freshfields Bruckhaus Deringer "Acrylamide in food—The approach of regulators across Europe," Feb. 2003 (20 pages).

Friedman, Mendel, et al., "Inhibition of Browning by Sulfur Amino Acids. 1. Heated Amino Acid-Glucose Systems," J. Agric. Food Chem., 1990, 38, pages 1641-1647.

Friedman, Mendel "The Impact of the Maillard Reaction on the Nutritional Value of Food Proteins" Ch. 6 from The Maillard Reaction: Consequences for the Chemical and Life Sciences, Ikan, Raphael (ed.), 1996, 24 pages.

Harmony House Foods, Inc., http://web.archive.org/web/20050425210612/www.harmonyhousefoods.com/slicedpotato.html, Apr. 25, 2005, 2 pages.

Health Canada Food & Nutrition "Acrylamide and Food" Dec. 1, 2005 (3 pages).

Health Canada Food & Nutrition "Major pathway of formation of acrylamide in foods and possible approaches to mitigation" Mar. 11, 2005 (2 pages).

Health Canada OCAPI Involving You publication, "Acrylamide and Food," vol. 2, No. 1, Autumn 2002, 2 pages.

Heldman, Dennis R., et al. "Principles of Food Processing" book, 1997, p. 193.

Igoe, Robert, Dictionary of Food Ingredients, 4th ed., (Aspen Publishers 2001), pp. 24, 35, 43, 109, and 167.

Jacobs, Morris B., Ph.D. "The Chemistry and Technology of Food and Food Products" textbook, 1951, pp. 221-226.

Jespersen, Neil "Chemistry" from Barron's College Review Series on Science, 1997, p. 210.

Kirk, Raymond E., et al. "Enciclopedia de Tecnologia Quimica" 1962, pp. 986-998.

Kretovich, V.L. "Plant Biochemistry" book, 1986, pp. 8-11 (English translation).

Martin, Fiona L., et al. "Formation of Strecker Aldehydes and Pyrazines in a Fried Potato Model System" J. Agric. Food Chem. 2001, 49, pp. 3885-3892.

Segtnan, Vegard H., et al. "Screening of acrylamide contents in potato crisps using process variable settings and near-infrared spectroscopy" Mol. Nutr. Food Res. vol. 50, 2006, pp. 811-817.

"Temperature and Heat—Local Materials" Mar. 2003 found at http://web.archive.org/web/20030321105136/http://www.pa.uky.edu/sciworks/xtra/local.htm (3 pages).

U.S. Food and Drug Administration Public Meeting "Assessing Acrylamide in the U.S. Food Supply," Sep. 30, 2002 (5 pages).

Alternative Medicine Review "Glutathione, Reduced (GSH)" vol. 6, No. 6, 2001, pp. 601-607.

Ashoor, S.H. & Zent, J.B., "Maillard Browning of Common Amino Acids and Sugars," (Abstract), Wiley InterScience Journals: J. Food Science, vol. 49, Issue 4, Jul. 1984, 2 pages.

Database WPI Week 199329 Derwent Publications Ltd., London, GB; AN 1993-234163 XP002473734 & SU 1 750 586 A1 (INTERBIOS RES ASSOC) Jul. 30, 1992, 1 page.

Francis, Frederick J.; "Encyclopedia of Food Science and Technology"; 2nd Edition, 2000, pp. 2160-2161.

Hughes B.P. "The amino acid composition of potato protein and of cooked potato" British J. of Nutrition, vol. 12, Issue 02, May 1958, pp. 188-195.

Rossell, J.B. (ed.) "Frying—Improving Quality" CRC Press, 2001, pp. 198-214 and 306-308.

Rydberg, Per, et al. "Investigations of Factors That Influence the Acrylamide Content of Heated Foodstuffs" J. Agric. Food Chem. 2003, vol. 51, pp. 7012-7018.

Stadler, Richard H., et al. "Acrylamide from Maillard reaction products" Nature Magazine Oct. 3, 2002 found at www.nature.com/nature (2 pages).

Talburt & Smith (eds.), Potato Processing 4th Ed. 1987, "Improving the Color of Potato Chips," pp. 403-405.

Webb, Edwin C., "Enzyme Nomenclature 1992," Academic Press, p. 422.

Wulfsberg, Gary, Inorganic Chemistry book, University Science Books, 2000, p. 289.

Zhang, Yu, et al., "Study on Formation of Acrylamide in Asparagine-Sugar Microwave Heating Systems Using UPLC-MS/MS Analytical Method," ScienceDirect, Food Chemistry 108 (2008), pp. 542-550.

Zyzak, David, et al. v. Elder, Vincent Allen, et al., Board of Patent Appeals and Interferences, Judgment-Arbitration-Bd.R. 126(f),Apr. 14, 2008, 2 pages.

Decision of Rejection, Japanese Pat. App. No. 2007-544461 dated Mar. 16, 2010 from atty. file, translated into English (2 pages).

"Kagaku Dai-jiten (Encyclopedia of Chemistry)," edited by Ohki Michinori, et al., 1989, pp. 317, 96, and 1661 (6 pages).

"Shokuhin Tenkabutsu Binran (List of Food Additives)," 1964, p. 249 (2 pages).

Standard Electrode Potentials, http://www.benjamin-mills.com/chemistry/ecells.htm (2 pages).

AFSSA, French Food Safety Agency, "Acrylamide: Information Point," Jul. 24, 2002 (11 pages).

* cited by examiner

FIG. 10

| PARAMETER | CONTROL | TEST |
|---|---|---|
| FRYER INLET OIL TEMPERATURE, C | 179 | 174 |
| FRYER SLICE DWELL TIME, SEC | 190 | 190 |
| FRYER EXIT OIL TEMPERTURE, C | 154 | 149 |
| SLICE MOISTURE AT FRYER EXIT, WT % | 1.4 | 2.5 |
| FINISH DRYER AIR TEMPERATURE, C | NOT USED | 110 |
| PAR FRIED SLICE DWELL TIME IN FINISH DRYER, SEC | NOT USED | 360 |
| FINISHED DRIED CHIP MOISTURE AT DRYER EXIT, WT % | NOT APPLICABLE | 1.4 |
| FINISHED CHIP AA LEVEL, PPB | 640 | 160 |

FIG. 12

| TEST | INITIAL OIL TEMPERATURE, C | FRYING PRESSURE, MBAR | FRYING TIME, SEC | FINISHED CHIP MOISTURE, WT % | FINISHED CHIP AA, PPB |
|---|---|---|---|---|---|
| 1 | 180 | ATMOSPHERIC | 185 | 1.28 | 470 |
| 2 | 175 | ATMOSPHERIC | 205 | 1.59 | 350 |
| 3 | 170 | ATMOSPHERIC | 215 | 1.6 | 610 |
| 4 | 165 | ATMOSPHERIC | 240 | 1.57 | 350 |
| 5 | 140 | 100 | 240 | 1.6 | 53 |
| 6 | 120 | 100 | 300 | 1.8 | <5 |
| 7 | 100 | 50 | 600 | 1.6 | <5 |

| PARAMETER | CONTROL | TEST 1 | TEST 2 | TEST 3 | TEST 4 |
|---|---|---|---|---|---|
| INITIAL PAR FRY OIL TEMPERATURE C | 177 | 177 | 177 | 177 | 177 |
| PAR FRYER PRESSURE, MBAR | ATMOSPHERIC | ATMOSPHERIC | ATMOSPHERIC | ATMOSPHERIC | ATMOSPHERIC |
| PAR FRY TIME, SEC | 153 | 101 | 76 | 63 | 43 |
| PAR FRY SLICE MOISTURE, WT % | 0.83 | 3 | 5 | 7.5 | 10 |
| FINISH FRY OIL TEMPERATURE, C | NO FINISH FRY | 120 | 120 | 120 | 120 |
| FINISH FRY PRESSURE, MBAR | NO FINISH FRY | 100 | 100 | 100 | 100 |
| FINISH FRY TIME, SEC | NO FINISH FRY | 44 | 85 | 101 | 118 |
| FINISHED CHIP MOISTURE, WT % | 0.83 (SAME AS PAR FRY MOISTURE) | 0.71 | 0.74 | 0.82 | 0.96 |
| FINISHED CHIP AA, PPB | 370 | 220 | 48 | 34 | 13 |
| FINISHED CHIP OIL CONTENT % | 49.8 | 47.5 | 44.4 | 44.8 | 42.5 |

*FIG. 11*

METHOD FOR REDUCING ASPARAGINE IN FOOD PRODUCTS

CROSS-REFERENCE TO RELATED APPLICATIONS

This application is a continuation-in-part of U.S. patent application Ser. No. 10/371,448, filed on Feb. 21, 2003, now U.S. Pat. No. 7,393,550, and is a continuation-in-part of U.S. patent application Ser. No. 11/344,992, filed on Feb. 1, 2006, which is a continuation of U.S. patent application Ser. No. 10/247,504 (now U.S. Pat. No. 7,037,540) filed on Sep. 19, 2002, all of which are herein incorporated by reference. To the extent any of the incorporated disclosures conflict with this disclosure, this disclosure should be viewed as controlling.

BACKGROUND OF THE INVENTION

1. Technical Field

The present invention relates to a method for reducing the amount of asparagine, a pre-cursor of acrylamide in a food product. This invention permits the production of foods having significantly reduced levels of acrylamide, and more particularly the invention is directed towards a method for leaching at least one acrylamide pre-cursor with an extract that is deficient in the acrylamide pre-cursor being leached.

2. Description of Related Art

The chemical acrylamide has long been used in its polymer form in industrial applications for water treatment, enhanced oil recovery, papermaking, flocculants, thickeners, ore processing and permanent-press fabrics. Acrylamide precipitates as a white crystalline solid, is odorless, and is highly soluble in water (2155 g/L at 30° C.). Synonyms for acrylamide include 2-propenamide, ethylene carboxamide, acrylic acid amide, vinyl amide, and propenoic acid amide. Acrylamide has a molecular mass of 71.08, a melting point of 84.5° C., and a boiling point of 125° C. at 25 mmHg.

In very recent times, a wide variety of foods have tested positive for the presence of acrylamide monomer. Acrylamide has especially been found primarily in carbohydrate food products that have been heated or processed at high temperatures. Examples of foods that have tested positive for acrylamide include coffee, cereals, cookies, potato chips, crackers, french-fried potatoes, breads and rolls, and fried breaded meats. In general, relatively low contents of acrylamide have been found in heated protein-rich foods, while relatively high contents of acrylamide have been found in carbohydrate-rich foods, compared to non-detectable levels in unheated and boiled foods. Reported levels of acrylamide found in various similarly processed foods include a range of 330-2,300 (μg/kg) in potato chips, a range of 300-1100 (μg/kg) in French fries, a range 120-180 (μg/kg) in corn chips, and levels ranging from not detectable up to 1400 (μg/kg) in various breakfast cereals.

It is presently believed that acrylamide is formed from the presence of amino acids and reducing sugars. For example, it is believed that a reaction between free asparagine, an amino acid commonly found in raw vegetables, and free reducing sugars accounts for the majority of acrylamide found in fried food products. Asparagine accounts for approximately 40% of the total free amino acids found in raw potatoes, approximately 18% of the total free amino acids found in high protein rye, and approximately 14% of the total free amino acids found in wheat.

The formation of acrylamide from amino acids other than asparagine is possible, but it has not yet been confirmed to any degree of certainty. For example, some acrylamide formation has been reported from testing glutamine, methionine, cysteine, and aspartic acid as pre-cursors. These findings are difficult to confirm, however, due to potential asparagine impurities in stock amino acids. Nonetheless, asparagine has been identified as the amino acid pre-cursor most responsible for the formation of acrylamide.

Since acrylamide in foods is a recently discovered phenomenon, its exact mechanism of formation has not been confirmed. However, it is now believed that the most likely route for acrylamide formation involves a Maillard reaction. The Maillard reaction has long been recognized in food chemistry as one of the most important chemical reactions in food processing and can affect flavor, color, and the nutritional value of the food. The Maillard reaction requires heat, moisture, reducing sugars, and amino acids.

The Maillard reaction involves a series of complex reactions with numerous intermediates, but can be generally described as involving three steps. The first step of the Maillard reaction involves the combination of a free amino group (from free amino acids and/or proteins) with a reducing sugar (such as glucose) to form Amadori or Heyns rearrangement products. The second step involves degradation of the Amadori or Heyns rearrangement products via different alternative routes involving deoxyosones, fission, or Strecker degradation. A complex series of reactions including dehydration, elimination, cyclization, fission, and fragmentation result in a pool of flavor intermediates and flavor compounds. The third step of the Maillard reaction is characterized by the formation of brown nitrogenous polymers and co-polymers. Using the Maillard reaction as the likely route for the formation of acrylamide, FIG. 1 illustrates a simplification of suspected pathways for the formation of acrylamide starting with asparagine and glucose.

Acrylamide has not been determined to be detrimental to humans, but its presence in food products, especially at elevated levels, is undesirable. As noted previously, relatively higher concentrations of acrylamide are found in food products that have been heated or thermally processed. The reduction of acrylamide in such food products could be accomplished by reducing or eliminating the precursor compounds that form acrylamide, inhibiting the formation of acrylamide during the processing of the food, breaking down or reacting the acrylamide monomer once formed in the food, or removing acrylamide from the product prior to consumption. Understandably, each food product presents unique challenges for accomplishing any of the above options. For example, foods that are sliced and cooked as coherent pieces may not be readily mixed with various additives without physically destroying the cell structures that give the food products their unique characteristics upon cooking. Other processing requirements for specific food products may likewise make acrylamide reduction strategies incompatible or extremely difficult.

By way of example, FIG. 2 illustrates well known prior art methods for making fried potato chips from raw potato stock. The raw potatoes, which contain about 80% or more water by weight, first proceed to a peeling step 21. After the skins are peeled from the raw potatoes, the potatoes are then transported to a slicing step 22. The thickness of each potato slice at the slicing step 22 is dependent on the desired the thickness of the final product. An example in the prior art involves slicing the potatoes to a thickness of about 0.04 to about 0.08 inches. These slices are then transported to a washing step 23, wherein the surface starch on each slice is removed with water. The washed potato slices are then transported to a cooking step 24. This cooking step 24 typically involves frying the slices in a continuous fryer at, for example, about 171° C. to about 182° C. (340-360° F.) for approximately two to three minutes. The cooking step generally reduces the moisture level of the chip to less than 2% by weight. For example, a typical fried potato chip exits the fryer with approximately 1-2% moisture by weight. The cooked potato chips are then transported to a seasoning step 25, where seasonings are applied in a rotation drum. Finally, the seasoned chips proceed to a packaging step 26. This packaging step 26 usually involves feeding the seasoned chips to one or more weighers which then direct chips to one or more vertical form, fill, and seal machines for packaging in a flexible package. Once packaged, the product goes into distribution and is purchased by a consumer.

Minor adjustments in a number of the potato chip processing steps described above can result in significant changes in the characteristics of the final product. For example, an extended residence time of the slices in water at the washing step 23 can result in leaching compounds from the slices that provide the end product with its potato flavor, color and texture. Increased residence times or heating temperatures at the cooking step 24 can result in an increase to in the Maillard browning levels in the chip, as well as a lower moisture content. If it is desirable to incorporate ingredients into the potato slices prior to frying, it may be necessary to establish mechanisms that provide for the absorption of the added ingredients into the interior portions of the slices without disrupting the cellular structure of the chip or leaching beneficial compounds from the slice.

By way of another example of heated food products that represent unique challenges to reducing acrylamide levels in the final products, snacks can also be made as a fabricated snack. The term "fabricated snack" means a snack food that uses as its starting ingredient something other than the original and unaltered starchy starting material. For example, fabricated snacks include fabricated potato chips that use a dehydrated potato product as a starting material and corn chips which use a masa flour as its starting material. It is noted here that the dehydrated potato product can be potato flour, potato flakes, potato granules, or any other form in which dehydrated potatoes exist. When any of these terms are used in this application, it is understood that all of these variations are included.

Referring back to FIG. 2, a fabricated potato chip does not require the peeling step 21, the slicing step 22, or the washing step 23. Instead, fabricated potato chips start with a dehydrated potato product such as potato flakes. The dehydrated potato product is mixed with water and other minor ingredients to form a dough. This dough is then sheeted and cut before proceeding to a cooking step. The cooking step may involve frying or baking. The chips then proceed to a seasoning step and a packaging step. The mixing of the potato dough generally lends itself to the easy addition of other ingredients. Conversely, the addition of such ingredients to a raw food product, such as potato slices, requires that a mechanism be found to allow for the penetration of ingredients into the cellular structure of the product. However, the addition of any ingredients in the mixing step must be done with the consideration that the ingredients may adversely affect the sheeting characteristics of the dough as well as the final chip characteristics.

It would be desirable to develop one or more methods of reducing the level of acrylamide in the end product of heated or thermally processed foods. Ideally, such a process should substantially reduce or eliminate the acrylamide in the end product without adversely affecting the quality and characteristics of the end product. Further, the method should be easy to implement and, preferably, add little or no cost to the overall process.

U.S. Pat. No. 3,934,046 ("Weaver"), does not specifically address a method for reducing acrylamide formation but, its teachings are pertinent to the problem at hand. It is well known in the art that the browning of thermally processed foods is caused in part by the heating of amino acids, such as asparagine, in the presence of reducing sugars. As explained in Weaver, "the browning tendency of the tubers increases as the content of reducing sugars increases. It has also been demonstrated that the reducing sugars react with the nitrogenous constituents in the potatoes, producing dark-colored reaction products." Weaver teaches that leaching raw potato pieces with hot water reduces the browning that occurs in the cooking phase. Weaver, however, also explains the undesirable effect of leaching purely with hot water: "in the case of potato chips, hot-water leaching is not employed because texture and flavor are almost completely destroyed under conditions necessary to adequately prevent darkening." This is because the water leaches all components of the potato slices for which a concentration gradient exists between the potato stock and the water. Consequently, all sugars and amino acids are leached indiscriminately from the potato stock.

Although Weaver was not directed towards reducing acrylamide levels in thermally processed foods, Weaver's general concept of leaching potato pieces can be improved upon and applied to the present problem of reducing acrylamide formation. It would therefore be useful to have a method for reducing acrylamide formation in thermally processed foods by leaching acrylamide pre-cursors selectively out of raw food pieces without substantially affecting food texture and flavor. Such a method would ideally require removing the leached acrylamide pre-cursors from the leaching extract in order to reuse the leaching extract.

SUMMARY OF THE INVENTION

This present invention is a method for reducing the amount of asparagine in a potato products comprising in one embodiment: continuously providing a substantially untreated potato feed having a first concentration of asparagine and leaching asparagine out of said untreated potato feed with an asparagine-deficient potato extract, thereby forming a post-wash extract containing asparagine, as well as a treated potatoes having a second concentration of asparagine that is less than said first concentration. In one embodiment, the method further comprises removing asparagine from said post-wash extract with at least one asparagine removal unit, thereby regenerating said asparagine-deficient potato extract and reusing said asparagine-deficient potato extract.

In one embodiment, the post-wash extract can be regenerated to reduce asparagine or other acrylamide pre-cursors by one or more methods such as using an enzyme, such as asparaginase, to breakdown the acrylamide pre-cursor asparagine into reaction products to reduce the concentration of the pre-cursor. The resultant reaction products can then be removed in later unit operations. Another method that can be employed to remove the acrylamide pre-cursor is use of an ion exchange resin.

In another embodiment, the leaching liquid is ultrasonically vibrated while it is in contact with the potato pieces. In yet another embodiment, acrylamide pre-cursors, along with other water-soluble compounds, are non-selectively leached out of the raw potato pieces by pure water, in a first contacting stage. Next, the acrylamide pre-cursors are removed from the leaching extract, and the previously leached, desirable compounds are then returned to the potato pieces in a second contacting stage.

In one embodiment, the invention provides a method of reducing asparagine in a food ingredient comprising the steps of providing a food ingredient having a first concentration of asparagine, selectively leaching asparagine out of said food ingredient with an asparagine-deficient food extract, such that said food ingredient has a second concentration of asparagine that is less than said first concentration. The above, as well as additional features and advantages of the invention will become apparent in the following written detailed description.

BRIEF DESCRIPTION OF THE DRAWINGS

The novel features believed characteristic of the invention are set forth in the appended claims. The invention itself however, as well as a preferred mode of use, further objectives and advantages thereof, will be best understood by reference to the following detailed description of illustrative embodiments when read in conjunction with the accompanying drawings, wherein:

FIG. 10 is a chart showing the operating conditions and results of an experiment in which a control sample of potato slices was atmospheric fried to about 1.4% moisture by weight, and a test sample was atmospheric fried to about 2.5% moisture by weight, then oven-dried to about 1.4% moisture by weight;

FIG. 11 is a chart showing the operating conditions and results of several experiments in which a control sample of potato slices was atmospheric fried to about 0.8% moisture by weight, and four test samples were atmospheric par-fried to about 3-10% moisture by weight, then low-temperature vacuum fried to below 1% moisture by weight; and FIG. 12 is a chart showing the operating conditions and results of seven experiments in which four test samples were atmospheric fried in oil with initial temperatures ranging from about 165° C. to about 180° C. (329° F.-356° F.) for about 3-4 minutes, and three test samples were low-temperature vacuum fried for about 4-10 minutes at temperatures ranging from about 100° C. to about 140° C. (212° F.-284° F.) and pressures ranging from about 50 to about 100 millibars.

DETAILED DESCRIPTION OF THE INVENTION

Figures 1, 2:
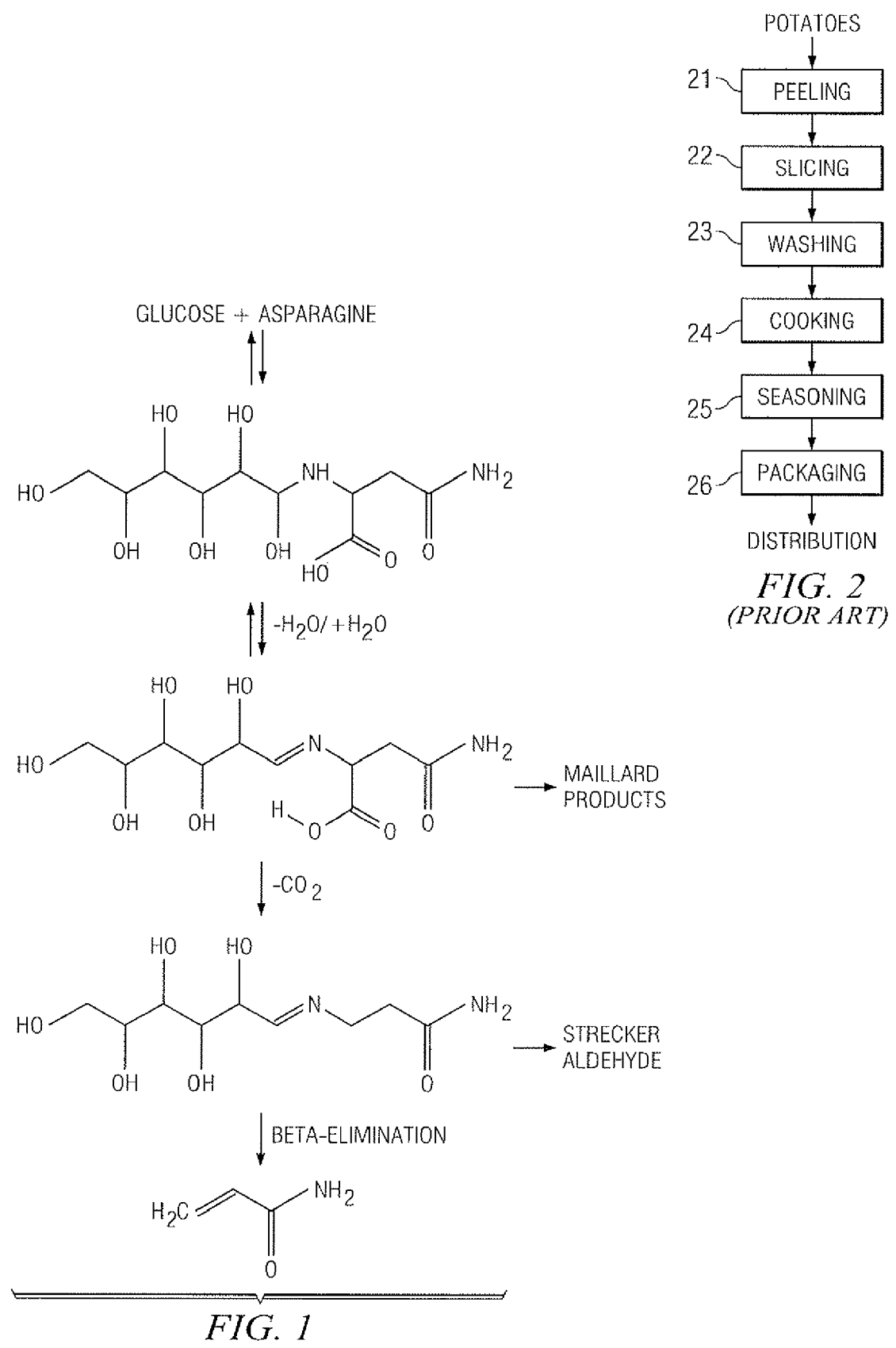
FIG. 1 is a schematic of suspected chemical pathways for acrylamide formation.
FIG. 2 is a schematic of prior art potato chip processing steps.

The formation of acrylamide in thermally processed foods requires a source of carbon and a source of nitrogen. It is hypothesized that carbon is provided by a carbohydrate source and nitrogen is provided by a protein source or amino acid source. Many plant-derived food ingredients such as rice, wheat, corn, barley, soy, potato and oats contain asparagine and are primarily carbohydrates having minor amino acid components. Typically, such food ingredients have a small amino acid pool, which contains other amino acids in addition to asparagine. There are twenty standard amino acids that are the building blocks of proteins and can be found in these food ingredients including, but not limited to, lysine, alanine, asparagine, glutamine, arginine, histidine, glycine and aspartic acid.

By "thermally processed" is meant food or food ingredients wherein components of the food, such as a mixture of food ingredients, are heated to food temperatures of at least 120° C. at ambient pressure. Thermally processing can also encompass lower temperatures at pressures below atmospheric. The food ingredient may be separately processed at elevated temperature prior to the formation of the final food product. As referred to herein, the thermally-processed foods include, by way of example and without limitation, all of the foods previously listed as examples of fabricated snacks and fabricated foods, as well as French fries, yam fries, other tuber or root materials, cooked vegetables including cooked asparagus, onions, and tomatoes, coffee beans, cocoa beans, cooked meats, dehydrated fruits and vegetables, heat-processed animal feed, tobacco, tea, roasted or cooked nuts, soybeans, molasses, sauces such as barbecue sauce, plantain chips, apple chips, fried bananas, and other cooked fruits. Examples of thermally processed food ingredients include processed oats, par-boiled and dried rice, cooked soy products, corn masa, roasted coffee beans and roasted cacao beans.

Alternatively, raw food ingredients can be used in the preparation of the final food product wherein the production of the final food product includes a thermal heating step. One example of raw material processing wherein the final food product results from a thermal heating step is the manufacture of potato chips from raw potato slices by the step of frying at a temperature of from about 120° C. to about 220° C. or the production of French fries or other fried food products at similar temperatures In accordance with the present invention, however, a significant formation of acrylamide has been found to occur when the amino acid asparagine is heated in the presence of a simple sugar. Heating other amino acids such as lysine and alanine in the presence of a simple sugar such as glucose does not lead to the formation of acrylamide. But, surprisingly, the presence of asparagine with another amino acid, such as lysine, in the presence of a simple sugar does cause an increase in the formation of acrylamide that is much greater than when asparagine is the only amino acid present.

Having established the rapid formation of acrylamide when asparagine is heated in the presence of a simple sugar, a reduction of acrylamide in thermally processed foods can be achieved by inactivating the asparagine. By "inactivating" is meant removing asparagine from the food or rendering asparagine non-reactive along the acrylamide formation route by means of conversion or binding to another chemical that interferes with the formation of acrylamide from asparagine.

One such method for inactivating is to contact asparagine with the enzyme asparaginase. This enzyme decomposes asparagine to aspartic acid and ammonia. Asparagine may also be inactivated as the pre-cursor of acrylamide in a thermally processed food by leaching. The solubility of asparagine in an aqueous solution can be facilitated when the pH of the solution is maintained as slightly acidic or slightly basic, preferably between a pH of about 5 about 6.5 and between about 7.5 and about 9.0 at ambient temperature. The solubility of asparagine can also be facilitated by supplying an elevated temperature of between about 100° F. (37° C.) and about 150° F. Asparagine may further be inactivated as the pre-cursor of acrylamide in a thermally processed food by fermentation. Asparagine can also be incorporated into proteins to inactivate asparagine as a pre-cursor to acrylamide. Asparagine may be further inactivated as the pre-cursor of acrylamide by the addition of a pH reducing salt such as calcium lactate, calcium chloride or calcium malate.

Other techniques will be evident to those skilled in the art to effect the inactivation of asparagine in a way that interferes with the formation of acrylamide. With lower levels of asparagine in the food ingredient or the food product prior to thermal processing, the level of acrylamide in the final processed food will be dramatically reduced.

EXAMPLE

The reduction of acrylamide formation when asparagine and glucose are heated in the presence of the enzyme asparaginase is demonstrated in this example. The enzyme asparaginase was dissolved in about 0.05 M Tris-hydrochloric acid buffer at pH 8.6 to make an active asparaginase solution. A control asparaginase solution was also made by heating a portion of the active asparaginase solution at about 100° C. for about 20 minutes to deactivate the enzyme. In the control, about 0.2 grams glucose, about 0.1 gram asparagine and about 20 mils of the heated asparaginase solution were combined in a 20-ml headspace vial. In the active enzyme experiment, about 0.2 grams of glucose, about 0.1 grams asparagine and about 20 mils of active asparaginase solution were combined in a 20-ml headspace vial. The amount of enzyme in the vial was about 250 enzyme units. The control and active enzyme mixtures were processed together in duplicate. The vials were kept at about 37° C. for about 2 hours, then placed in an about 80° C. oven for about 40 hours to evaporate to dryness. After heating, about 0.2 ml of water was added to each vial. The vials were then heated in a gas chromatographic oven with the following temperature profile: proceeding from an initial temperature of about 40° C.; heating about 20° C. per minute to about 200° C.; and holding at about 200° C. for about 2 minutes before cooling to about 40° C. The reaction mixtures were then extracted with about 50 ml water and acrylamide in the water was measure by GC-MS. The values measured are shown in Table 1 below:

TABLE 1

Acrylamide Formation in the Presence of Asparaginase and Glucose

| Test Material | Acrylamide (ppb) | Percent Reduction |
|---|---|---|
| Control 1 | 334,810 | — |
| Control 2 | 324,688 | — |
| Active Asparaginase 1 | 66 | 99.9 |
| Active Asparaginase 2 | 273 | 99.9 |

As can be seen, treatment of the system with an enzyme that decomposes asparagine to aspartic acid and ammonia reduced acrylamide formation by more than 99.9%. This experiment establishes that reducing the concentration of asparagine, or the reactive nature of asparagine, will reduce acrylamide formation.

In addition to inactivating asparagine, plant-derived food ingredients can also be sourced from plants that are bred and selected for having asparagine levels that are lower than those of other similar plants. A reduction in the amount of asparagine in the plant-derived food ingredient will be reflected in the amount of acrylamide that is formed under the same conditions of thermal treatment.

The above demonstrates the reduction of acrylamide that can be achieved by additives such as asparaginase. However, investigations into the effects of the various unit operations or processing steps on the formation of acrylamide in finished food products have also lead to interesting results. These results demonstrate an ability to modify one or more unit operations in any given prior art process for making a food product so that the resulting cooked food product has a reduced concentration of acrylamide. By "reduced concentration of acrylamide" is meant a concentration of acrylamide that is lower than the concentration that would have formed during an unmodified prior art process for cooking the particular food product in question. The terms "reduced concentration of acrylamide," "reduced acrylamide concentration," and "reduced acrylamide level" are all used interchangeably in this application. For the purpose of this application, "unit operations" means a definable segment of an overall method for producing a food product. For example, referring to FIG. 2, each one of the potato chip processing steps (the peeling step 21, the slicing step 22, the washing step 23, the cooking step 24, the seasoning step 25, and the packaging step 26) is considered a separate unit operation with regard to the overall process of producing a potato chip food product.

A first example of the manipulation of a unit operation involves the washing step 23 (illustrated in FIG. 2) of potato chips produced by slicing raw potato stock. The prior art method of washing slices involves rinsing the chips with water at room temperature. The average residence time of each chip in this water rinse in the prior art is typically less than about 60 seconds, depending on the equipment used.

Figure 3:
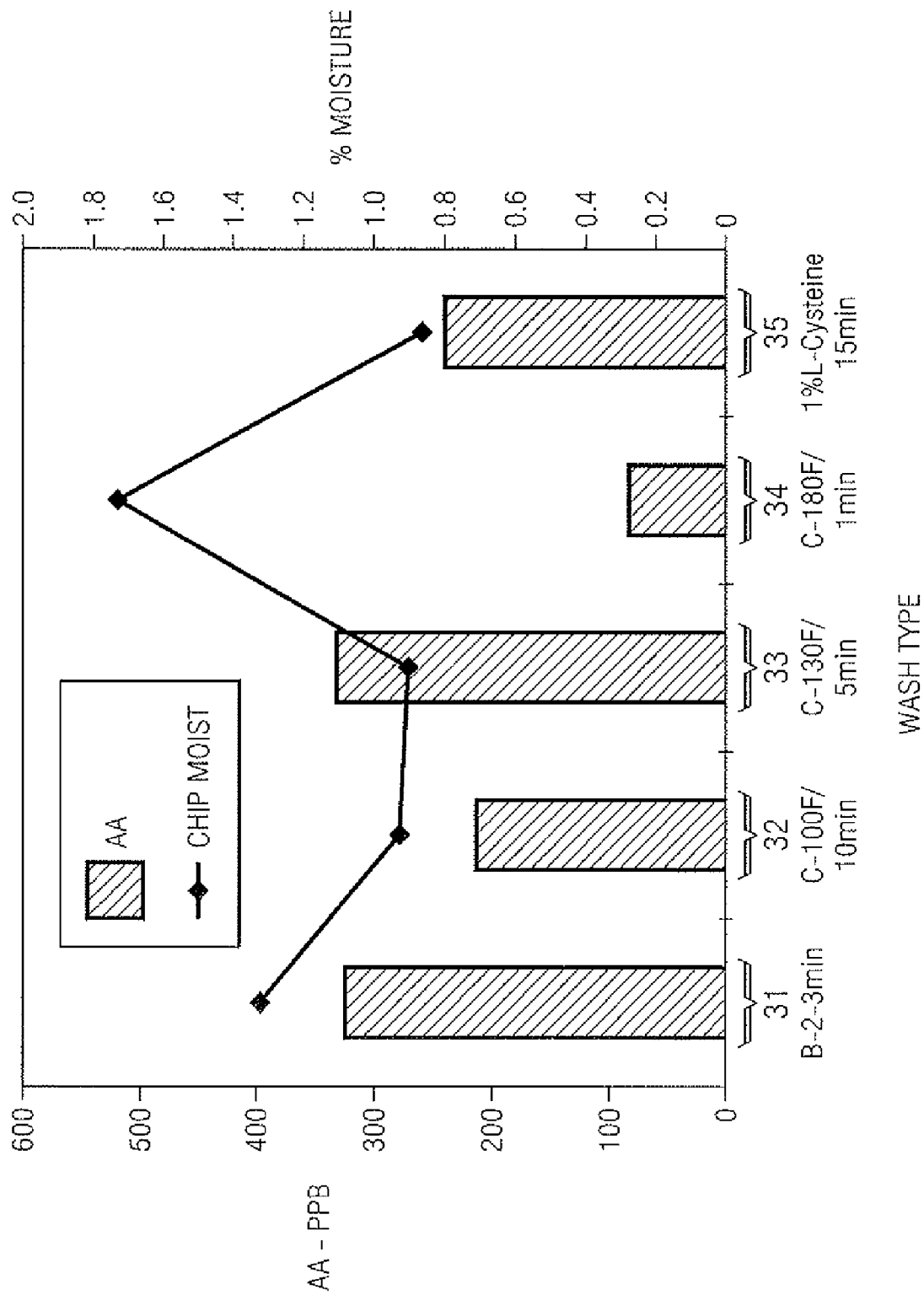
FIG. 3 is a graph showing, on the y-axis in parts per billion ("ppb"), acrylamide concentrations of potato test samples that were fried after contacting in various ways described along the x-axis, as well as the final moisture content by weight.

FIG. 3 illustrates how the chip washing unit operation can be manipulated such that acrylamide levels in the finished chip product can be adjusted. According to the present invention, the washing step 23 can be manipulated to comprise a contacting step, where a continuous feed of potato slices is contacted with an aqueous solution for residence times and at temperatures that differ from those used in the prior art washing step. FIG. 3 is a chart showing on the left (from the viewer's perspective) vertical or y-axis, the amount of acrylamide ("AA") in parts per billion ("ppb") found in the finished potato chip product. The right vertical or y-axis of the graph in FIG. 3 shows the percent moisture by weight in the finished chip product. The acrylamide level is charted on the graph by the vertical bars, while the percent moisture level is charted by the line plot. The horizontal or x-axis of the chart shown in FIG. 3 lists various processing parameter changes made to the washing unit operations of a potato chip manufacturing process. The cooking time and temperature were identical for all product runs reflected in FIG. 3. Specifically, each sample was fried at about 178° C. (353° F.) for about 120-140 seconds. Consequently, the moisture levels of the end product tended to vary.

By way of comparison to the results shown in FIG. 3, the prior art washing step described above, using chip-stock potatoes sliced to a thickness of 0.05 inches and fried at about 178° C. (353° F.) for about 120-140 seconds, results in a finished product having an acrylamide level of about 300-500 ppb (which can be higher depending on glucose content and other potato stock variable) and a final moisture level by weight of about 1.4%. This prior art result is quite similar to the first data point 31 found on the chart shown in FIG. 3, which represents the base data point and involves a washing step with a water residence time for the potato slices of two to three minutes. Maintaining all other parameters in the overall processing of the potato chip, this minor change in the washing unit operations results in no noticeable change in the acrylamide level (approximately 330 ppb) or the moisture level of the finished product (approximately 1.35%), as compared to a product finished according to the prior art washing step.

The next data point 32 shown on the graph in FIG. 3 reflects a change in the washing step that comprises contacting the potato slices with water as the aqueous solution, increasing the contact time of the aqueous solution with the potato slices to ten minutes, and increasing the temperature of the aqueous solution from ambient or room temperature to about 38° C. (100° F.). This adjustment resulted in a decrease of the acrylamide in the finished product to approximately 210 ppb and a reduction in the moisture level of the finished product to less than 1% by weight. Interestingly, the third data point 33 reflects that increasing the aqueous solution (again, water) temperature to about 54° C. (130° F.) with an average contact time of five minutes did not result in appreciable reduction in acrylamide levels in the finished product. By contrast, the fourth data point 34 demonstrates an appreciable reduction in acrylamide levels in the final product (below 100 ppb) when the washing unit operation involves a contacting step providing one minute contact time with an aqueous solution comprising water at a temperature of about 82° C. (180° F.). However, the moisture level of the end-product chip was nearly 1.8%. The fifth data point 35 reflects that using a 1% L-Cysteine solution as the aqueous solution, at ambient temperatures for fifteen minutes, reduces the acrylamide level in the final product to less than 250 ppb.

Figure 4:
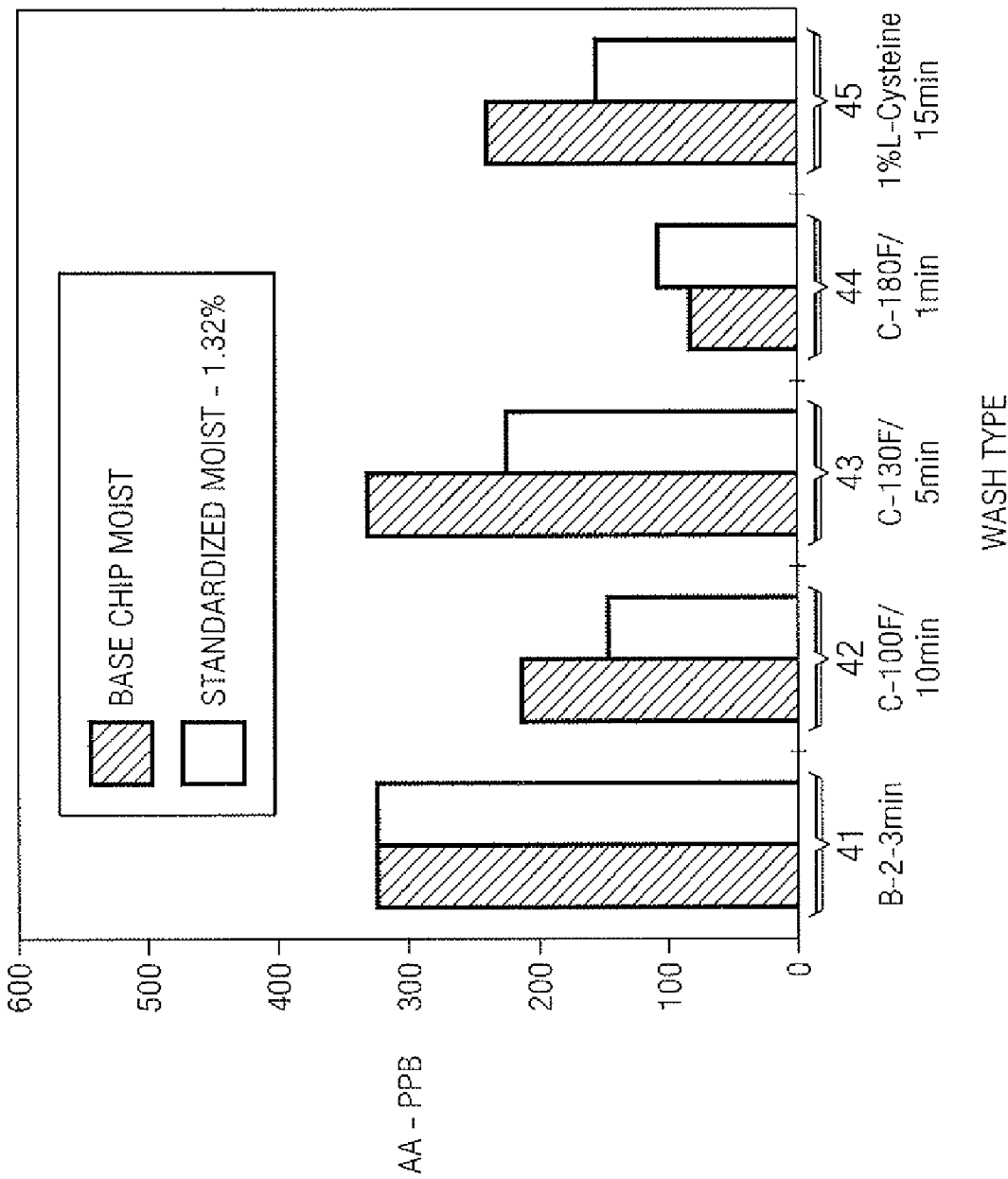
FIG. 4 is a graph comparing the original results from FIG. 3 with the FIG. 3 results after normalization to a moisture content of about 1.32% by weight.

In the graph illustrated in FIG. 4, the experiment results shown in FIG. 3 (the first of each pair of vertical bars) are normalized to depict the acrylamide levels that could be expected if the test samples were fried to the same standardized moisture level (the second of each pair of vertical bars). By assuming that the percent change in acrylamide level is inversely proportional to the percent change in the moisture level when moisture levels are low, the results of the test data shown in FIG. 3 can be normalized by multiplying the actual acrylamide levels by the percent change in the moisture levels required to reach the final moisture level of the base/standard sample. Normalizing the experiment data to the same moisture level allows one to more accurately compare the relative effectiveness of each contacting method at reducing acrylamide formation.

Referring back to FIG. 4, the vertical or y-axis is again labeled in ppb of acrylamide found in the finished product. The horizontal or x-axis is labeled to show the parameters of each data point. In FIG. 4, each data point shows a pair of vertical bars, the bars on the left of a pair are imported from FIG. 3 while the bars on the right of a pair reflect the expected results of the same contacting process parameters if the final product were fried to a uniform or standardized moisture level of 1.32%.

Once again, the first data point 41 is the base sample involving a two to three minute water wash at ambient temperature. The second data point 42 involves the contacting step according to the present invention, where the potato slices are contacted with an aqueous solution comprising water at a temperature of about 38° C. (100° F.) for a ten minute contact time. The left-hand bar again reflects that such contacting followed by frying at approximately 178° C. (353° F.) for about 120-130 seconds will result in just over 200 ppb acrylamide in the finished product and a finished product having a moisture level of less than 1%. However, the right-hand bar demonstrates that if a chip thus contacted were fried to a standardized moisture level of 1.32%, the projected acrylamide level would drop to approximately 150 ppb.

A similar desirable result occurs with regard to the third data point 43, while the fourth data point 44 reflects that the reduction of the moisture level of the finished product slightly raises the acrylamide level found. Interestingly, the last data point 45 reflects significant acrylamide reduction when an aqueous solution comprising 1% L-Cysteine and a fifteen-minute contact time is used. Furthermore, a particularly low acrylamide level is projected for a final chip moisture level of 1.32% by weight. It is also interesting to note that the projected acrylamide level for potato slices contacted with 1% L-Cysteine for a fifteen-minute contact time is nearly the same as the projected level for slices contacted with an aqueous solution comprising water for ten minutes at about 38° C. (100° F.).

Acrylamide reduction can also be achieved in other ways. Because asparagine appears to be the major pre-cursor to acrylamide, it is desirable to remove asparagine prior to cooking potato pieces so that acrylamide formation is reduced in the final cooked product. One embodiment of the present invention comprises a method for removing asparagine by using an asparagine-deficient potato extract or solution to leach asparagine out of raw potato pieces before cooking. Note that the terms 'pre-cursor' and 'asparagine' can be used interchangeably in this description, since asparagine has been identified as the single pre-cursor most directly linked to acrylamide formation. However, the invention can likewise be used to remove any specific pre-cursor identified as necessary for acrylamide formation.

Leaching of components in the potato slices by the potato extract or the leaching stream occurs for those components for which a concentration gradient exists between the soluble matter in the potato slices and the potato extract or the leaching stream. The leaching may be accomplished selectively by a potato extract that is deficient in the acrylamide pre-cursor to be removed, but has concentration levels of other desirable soluble matter or solutes that are at or near equilibrium with the corresponding concentration levels in the potato slices. By 'equilibrium' is meant one of two conditions: 1) the aqueous concentrations of a particular solute are substantially the same both in the extract and in the potatoes; or 2) the extract is saturated and cannot absorb any more of that particular solute. As used herein, desirable soluble matter is defined as any native soluble potato compound, other than reducing sugars, that is not an acrylamide pre-cursor.

An example of selective leaching involves making the potato extract deficient in asparagine, and then contacting the raw potato slices with the asparagine-deficient potato extract to selectively leach asparagine out of the raw potato slices. In one embodiment, the leaching is further enhanced by ultrasonically vibrating the potato extract while the potato extract is in contact with the potato slices. If desired, the potato extract or the leaching stream can be treated to remove the leached acrylamide pre-cursors so that the potato extract or the leaching stream can be recycled for continuous use in the leaching of more potato slices.

Tests were run to ascertain the levels of asparagine in potato slices soaked in different solutions for different residence times. Twelve separate tests and a control test were performed. The control sample consisted of a fresh, unsoaked potato slice. The twelve tests consisted of soaking potato slices in four different solutions at three different residence times. The results are summarized in the Table 2 below.

TABLE 2

Asparagine reduction of potato slices soaked in potato extract.

| Solution heated to 120° F. | Residence Time Soaked in Solution | Asparagine in Potatoes (wt %) | % Asparagine Reduction from Control |
|---|---|---|---|
| Control | — | 0.66 | 0 |
| Water | 15 minutes | 0.47 | 29 |
| Water with Asparaginase | 15 minutes | 0.37 | 43 |
| Potato Extract | 15 minutes | 0.39 | 41 |
| Potato Extract with Asparaginase | 15 minutes | 0.39 | 41 |
| Water | 40 minutes | 0.33 | 51 |
| Water with Asparaginase | 40 minutes | 0.31 | 53 |
| Potato Extract | 40 minutes | 0.25 | 63 |
| Potato Extract with Asparaginase | 40 minutes | 0.12 | 81 |
| Water | 60 minutes | 0.26 | 61 |
| Water with Asparaginase | 60 minutes | 0.20 | 70 |
| Potato Extract | 60 minutes | 0.25 | 62 |
| Potato Extract with Asparaginase | 60 minutes | 0.05 | 93 |

Each batch of potato extract started with about 800 grams of peeled potato slices and about 1500 mL of water placed in a blender and made into an unfiltered potato extract. The unfiltered extract was then vacuum filtered though a laboratory filter paper with a 20 to 25 micrometer pore size to remove solids.

The filtered extract was further concentrated by repeating the steps in the above paragraph, but instead of adding about 800 grams of peeled potato slices to about 1500 mL of water, the 800 grams of potato slices were added to the filtered extract. This process was repeated several times to build-up the concentration of desirable soluble matter in the potato extract so as to minimize the amount of desirable soluble matter that was leached out of the potato slices.

The filtered potato extract was next heated to a temperature of 120° F. About 340 microliters of asparaginase having 14,280 units/ml was added to 1500 mL of the potato extract to result in an asparagine-deficient potato extract having about 4844 units of asparaginase. Of course, other levels of asparaginase can be used and in one embodiment, about 3,000 units to about 100,000 units of asparaginase are used per kilogram of total raw potato used to make the asparagine-deficient potato extract. Lower levels of asparaginase can be used, but more time may be required to achieve desired, lowered levels of asparagine in the asparagine-deficient potato extract. Higher levels of asparaginase can be used, but may be cost prohibitive in commercial embodiments.

All potato slice samples having a solids content of about 17.6% and were peeled and sliced. The control samples were not placed into any solution and the other samples were placed into each of the four solutions depicted in Table 2 above (water, water+asparaginase, potato extract, potato extract+asparaginase) that were maintained at 120° F. for about 15, about 40 and about 60 minutes and were tested for asparagine. The test results depicted by Table 2 above illustrate that potato extract is more effective than water in removing asparagine from potato slices. Further, because the asparagine was selectively removed from the potato slice, the serious impairment of texture and flavor from prior art hot water leaching does not occur since the levels of reducing sugars and other desirable soluble matter in the potato slice remains at acceptable levels. Consequently, one embodiment of the present invention comprises providing a potato extract deficient in asparagine and contacting potatoes such as sliced potatoes having a first concentration of asparagine with the asparagine-deficient potato extract to selectively leach asparagine from the potato slices. The potato slices can then be removed from the asparagine deficient potato extract, optionally rinsed and thermally processed. Separate tests have shown a relationship between the level of asparagine in a food product and the resultant level of acrylamide in that food product. Consequently, the resultant thermally processed potato slices with a reduced level of asparagine will have a reduced level of acrylamide.

In one embodiment, the potato extract is initially made from a potato to water ratio of between about 0.5 grams and about 2 grams of peeled potato is used per 1 mL of added solution. Higher potato to water ratios can make filtration more difficult. Thus, a lower ratio may be more desirable, especially if the potato extract is further concentrated by blending additional raw potato and filtered extract into an unfiltered extract and filtering the unfiltered extract into a potato extract. This process can be repeated until the potato extract is at or near equilibrium with the corresponding concentration levels in the potato slices.

Further, although the potato extract disclosed above uses a ratio of 800 grams of peeled potato slices to 1500 mL of water or filtered extract, this ratio can be optimized. Added water creates some concentration gradient between desirable soluble matter such as reducing sugars and the potato extract. Consequently, in one embodiment, additives such as reducing sugars including fructose and glucose are added to the potato extract to further minimize the concentration gradient of desirable soluble matter. Further, the initial solution can comprise additives such as reducing sugars or other desirable soluble matter to further reduce the concentration gradient.

In one embodiment, the level of added water is minimized. In one embodiment, the level of water initially added is eliminated. Consequently, no water is added and the extract comprises macerated potato. In one embodiment, the macerated potato is vacuum filtered into a potato extract.

Although the above illustrates a batch method that can be used to reduce asparagine, the method can be modified to run on a semi-continuous or continuous basis, as described below.

Before cooking potato slices or pieces, raw potatoes are typically peeled, sliced or cut, and then washed to remove excess starch and debris. As illustrated by the selective leaching system 1300 in FIG. 13*a*, the washing phase can be modified to include a continuous process for leaching acrylamide pre-cursors out of a continuous substantially untreated potato feed. For purposes herein, a peeled potato slice is untreated. In one embodiment, three main unit operations are used to wash the potatoes and selectively extract the main pre-cursor, asparagine: 1) an extraction unit 1320 leaches asparagine out of an untreated potato feed 1310 and into an asparagine-deficient potato extract 1380; 2) a starch removal unit 1340 removes excess, unbound starch 1336; and 3) at least one asparagine removal unit 1350 removes asparagine from the de-starched, post-wash potato extract 1334, which is then recycled (as asparagine-deficient extract 1380) to continuously wash and leach the untreated potato feed 1310. Thus treated potato slices 1312 then proceed to the next processing step, such as cooking or heating.

In the first unit operation, a stream of peeled and sliced potatoes containing acrylamide pre-cursors ("untreated potatoes") 1310 enters an extraction unit 1320, similar to the prior art washing step 23 of FIG. 2, where the potatoes are contacted with a pre-cursor deficient potato extract 1380. The pre-cursor deficient potato extract 1380 comprises a stream of water containing all of the water-soluble potato components with the exception of the particular acrylamide pre-cursor to be removed from the untreated potato feed 1310. Thus, at steady-state in the preferred embodiment, the pre-cursor deficient potato extract 1380 comprises an aqueous solution or suspension of all the water-soluble potato solids and compounds except asparagine. The potato extract generally includes water-soluble compounds such as reducing and non-reducing sugars, starches, and various amino acids. At steady-state, the concentrations of water-soluble compounds in the pre-cursor deficient extract 1380, other than starch and asparagine, are either in or nearly in equilibrium with the corresponding concentrations of water-soluble compounds in the untreated potato feed 1310. During the system start-up, the concentrations of water-soluble compounds in the pre-cursor deficient extract 1380 are brought up to equilibrium levels by cycling a predetermined amount of pure water (distilled, de-ionized, or treated by reverse-osmosis) through the leaching system 1300 until enough water-soluble matter is leached out of the untreated potato feed 1310 and into the extract 1322. Because the initial stream of potatoes entering the extraction unit are leached with water that is still relatively pure, a significant amount of desirable soluble matter is extracted out of those potatoes and into the cycling water. Some of those potatoes leached during start-up may result in lower quality potato chips after cooking, thus it may be desirable to simply discard those start-up potatoes after leaching. Similarly, it may also be desirable during start-up to use potatoes that would have otherwise been discarded because of an unacceptable size or shape. Again, those start-up potatoes may be discarded after washing if too much of the desired soluble compounds have been leached out.

In this and other embodiments involving selective leaching of asparagine, it is desirable for the pre-cursor deficient extract 1380 concentration levels (other than asparagine, excess starch, and undesirable impurities) to be in or nearly in equilibrium with the corresponding concentration levels in the untreated potato feed 1310 so that no concentration gradients draw desirable soluble matter out of the untreated potato feed 1310 during leaching. Thus, in one embodiment, there are only two major concentration gradients that should exist between the untreated potato feed 1310 and the pre-cursor deficient extract 1380 entering the extraction unit 1320: one drawing asparagine from the untreated potato feed 1310 to the pre-cursor deficient extract 1380, and another drawing starch from the untreated potato feed 1310 to the pre-cursor deficient extract 1380. In one embodiment, the potato slices are pre-washed to remove loose starch from the slices and reduce starch build-up in the extraction unit 1320. Furthermore, it may be desirable to use a heated pre-cursor deficient extract 1380. Because the solubility of asparagine in water increases with temperature, higher wash/leaching temperatures increase the amount of asparagine that can be leached with a given flow rate of pre-cursor deficient extract 1380. For example, typical leaching solution temperatures can range from about 70° F. to about 150° F. Further, the higher end of this temperature range (about 120° F. to about 150° F.) can be more preferred when potato extract is the leachate because less desirable soluble matter is leached due to the preferential leaching of asparagine.

Referring again to FIG. 13*a*, as the asparagine-deficient potato extract 1380 contacts the untreated potatoes 1310 in the extraction unit 1320, asparagine and starch are leached into the pre-cursor deficient extract 1380. In the preferred embodiment, the pre-cursor deficient extract 1380 contacts the untreated potatoes 1310 in a continuous, countercurrent fashion. It is well understood in the art that countercurrent flow, as compared to parallel flow, more effectively leaches a desired solute from a given solid. In another embodiment, the extraction process is further enhanced by ultrasonically vibrating the pre-cursor deficient extract 1380 while it is in contact with the untreated potato feed 1310. High frequency, short amplitude vibrations help increase the rate of mass transfer by reducing the thickness of boundary layers around the potato pieces. For example, more asparagine is leached out of potato slices in pure water when the slices are subjected to ultrasonic frequencies of 68 kHz and 170 kHz than is leached in pure water when no ultrasonic frequency is applied to the potato slices. Thus, ultrasonic frequencies will therefore also leach more asparagine out of potato slices into an asparagine-deficient extract than would be leached into the same extract absent ultrasonic treatment.

Various methods can be used to effect a continuous countercurrent extraction between the untreated potato feed 1310 and the pre-cursor deficient extract 1380. For example, one embodiment of the extraction unit 1320 utilizes at least one screw-type, immersion extractor similar to the kind used for blanching potatoes. In general, a screw-type extractor comprises a helix rotating inside a tube. The helix moves the solid to be leached in one direction along down the length of the tube while a countercurrent stream of extracting solvent flows along down the length of the tube in the opposite direction. Screw-type extractors for blanching potatoes are well known in the art, thus the construction and operation of screw-type extractors need not be described in detail herein. In this embodiment, untreated potatoes 1310 enter a screw-type extraction unit 1320 and are then continuously moved along by a rotating spiral or helix that runs the length of the extraction unit 1320. To increase throughput, the untreated potato feed 1310 can be divided and sent through several screw-type extraction units 1320 in parallel, then rejoined after exiting the extraction units. Within each such screw-type extraction unit 1320, the pre-cursor deficient potato extract 1380 enters the unit at the end where the treated potatoes 1312 exit, flows through down the extraction unit 1320 in the opposite direction that the treated potato stream 1310 travels, and exits the unit where the untreated potatoes 1310 first enter the unit 1320. As the pre-cursor deficient extract 1380 flows through down the tube in this countercurrent fashion, the pre-cursor deficient extract 1380 is forced to contact the untreated potato feed 1310, and acrylamide pre-cursors and starch are leached from the untreated potatoes 1310 into the pre-cursor deficient extract 1380. Because the potato pieces 1310 are firmly controlled by the helix, the pre-cursor deficient extract 1380 extract can be pumped through the extraction unit 1320 at higher pressures and velocities to more effectively leach out the acrylamide pre-cursors. However, where the size of the potato piece is important for subsequent processing, care must be taken not to apply pressures that will break or damage individual potato pieces in the feed 1310. The concentration levels of acrylamide precursors, such as asparagine, remaining in the potatoes exiting the extraction unit 1320 depend upon various parameters, such as the residence time in the unit, the flow rates of both the untreated potato feed 1310 and the pre-cursor deficient extract 1380, and the temperature of the precursor deficient extract 1380. For example, if a lower final concentration of pre-cursors is desired in the treated potato stream 1312, the length of the extraction unit 1320 can be increased, thereby increasing residence time.

Another embodiment of the extraction unit 1320 comprises a wash tank containing pre-cursor deficient potato extract 1380. In this particular embodiment, an open- or wire-mesh type conveyor carries untreated potatoes 1310 into one end of the tank and immerses them in the pre-cursor deficient potato extract 1380 for a predetermined time and distance before bringing the leached potatoes 1312 out of the pre-cursor deficient extract 1380 at the opposite end of the wash tank. To impart a countercurrent exchange between the pre-cursor deficient extract 1380 and the untreated potato feed 1310, the precursor deficient extract 1380 can be introduced into the tank at the end where the leached potatoes 1312 are removed, and the post-wash extract 1322 can be removed at the end where the untreated potato feed 1310 enters the tank. In potato chip manufacturing processes currently using a wash-tank type unit for removing excess starch, this particular embodiment of the acrylamide pre-cursor deficient extraction unit 1320 is easily implemented. The existing starch-removal wash tank can still be used with only a few minor changes. However, one disadvantage of this type of extractor is that the relative velocity between the untreated potato feed 1310 and the pre-cursor deficient extract 1380, within the tank must be low enough to prevent the untreated potato feed 1310 from being forced off of the conveyor. Thus, this embodiment may not leach pre-cursors out a potato feed 1310 as quickly as screw-type extractors.

Yet another embodiment of the extraction unit 1320 involves leaching by percolation of a pre-cursor deficient extract 1380 through moving beds of potato feed 1310. One such type of extractor is the Bollman extractor, which comprises a revolving bucket elevator in an enclosed casing. The bottom of every bucket, which contains potato feed 1310 to be leached, is perforated so that extract 1380 can percolate downwards from bucket to bucket. As Bollman-type extractors are well known in the art, the construction and operation of such extractors need not be described in great detail herein. The revolving elevator has both a rising side and a declining side, and it also has separate sumps for the rising and declining sides in which extract collects. Unlike the previous extraction unit embodiments, Bollman-type extractors have both countercurrent- and concurrent-flow sections: a countercurrent-flow section on the rising side and a concurrent-flow section on the declining side. In operation, untreated potatoes 1310 are placed into buckets at the top of the elevator on the declining side, and a pre-cursor deficient extract 1380 is introduced over the top buckets on the rising side. Extract that has percolated its way through the buckets on the rising side collects in the rising-side sump. The extract in the rising-side sump is pumped back to the top of the elevator and introduced over the buckets on the declining side. After reaching the declining-side sump, the post-wash extract 1322 is pumped out of the extraction unit 1320 and on to the next unit operation. Once the untreated potatoes 1310 have made their way down the declining side and up the rising side, they are removed from the top buckets on the rising side and transferred out of the extraction unit 1320. Leaching by percolation offers several advantages over leaching by immersion. Percolation typically offers a greater extraction rate than immersion because there tends to be more mixing in percolation, due to a shorter boundary layer between the extract solvent and the solids. When compared to screw-type immersion extractors, there tends to be less mechanical damage to the flakes. Furthermore, there is less tendency for plugging.

Yet another embodiment of the extraction unit 1320 comprises an inclined channel through which a potato pre-cursor deficient extract 1380 flows. While the pre-cursor deficient extract 1380 flows down the channel from its higher end to its lower end, an open- or wire-mesh type conveyor transports untreated potatoes 1310 up the channel and through the downward flowing pre-cursor deficient extract 1380. In order to promote greater surface area contact between the untreated potatoes 1310 and the pre-cursor deficient extract 1380, this wire-mesh type conveyor can be elevated slightly above the bottom of the channel so that the pre-cursor deficient extract 1380 flows above, below, and around the untreated potatoes 1310 to be leached. The conveyor can comprise any food-grade mesh, chain, perforated, or other liquid-pervious structure made from a durable material, such as stainless steel or another type of metal, a ceramic, or a polymer-based material. Several of these extraction units can be used in series to increase the leaching time and lower the final asparagine concentrations of the treated potatoes 1312 exiting the last extraction unit. Where several such extraction units are used in series, the pre-cursor deficient extract 1380 enters the top of the last extraction unit and makes its way down each unit's inclined channel until it reaches the bottom of the first extraction unit. By that time, the post-wash extract 1322 has pre-cursor concentrations near those of the untreated potatoes 1310.

After the post-wash extract 1322 exits the extraction unit 1320, it is transferred to the second unit operation, the starch removal unit 1340. In the preferred embodiment, the starch removal unit 1340 comprises a cyclone for centrifugally removing starch. Because starch particles have a higher density than most other water-soluble molecules in the post-wash extract 1322, the spinning cyclone 1340 causes the heavier-than-water starch particles to separate from the extract 1322 at the cyclone walls and then be directed out of the cyclone 1340 as a slurry or paste 1336. The de-starched, post-wash extract 1334 then leaves the cyclone 1340 and is transferred to at least one pre-cursor removal unit 1350. While the preferred embodiment of the starch removal unit 1340 comprises a cyclone, other types of equipment and methods can be used to remove starch. For example, starch might also be removed by filtration, batch sedimentation, or flocculation. Note, however, that the starch removal unit 1340 is not necessary if starch is eliminated from the untreated potato feed 1310 prior to the extraction unit 1320.

In the third unit operation, the de-starched, post-wash extract 1334 enters at least one pre-cursor removal unit 1350 where the acrylamide pre-cursors are removed. In one embodiment, each pre-cursor removal unit 1350 comprises either a packed-tower- or baffle-tower-type resin column such as an ion exchange resin comprising adsorption materials that selectively bind with the particular acrylamide pre-cursor to be removed. In one embodiment where asparagine is the major pre-cursor to be removed, each resin column comprises an immobilized enzyme such as asparaginase.

In one embodiment, the pre-cursor removal unit 1350 comprises a column having an asparaginase-coated resin or a resin that selectively removes asparagine from solution by, for example, binding with the asparagine. In one embodiment, as the de-starched, post-wash extract 1334 contacts the resin, the asparagine in the extract reacts with the resin and is converted in ammonia and aspartic acid.

In one embodiment, the de-starched, post-wash extract 1334 is introduced at the top of each column and percolates downward in a circuitous path on its way to the bottom. In one embodiment, as the de-starched, post-wash extract 1334 contacts the resin, asparagine is selectively removed by the resin. In any of the above embodiments, a significant amount of asparagine is removed from the de-starched, post-wash extract 1334 by the time it reaches the bottom of the resin column. As used herein, a significant amount is removed when at least 50% of the asparagine concentration is removed from the de-starched, post-wash extract 1334. The asparagine-deficient extract 1380 is then removed from the bottom of the resin column and recycled to the extraction unit 1320 for another round of leaching. Several such columns can be operated in series to further reduce the asparagine concentrations in the de-starched, post-wash extract 1334. Furthermore, two or more columns or series of columns can be run in parallel in order to allow one column (or series of columns) to be taken off-line for regeneration without halting the continuous leaching process 1300.

Figure 13A:
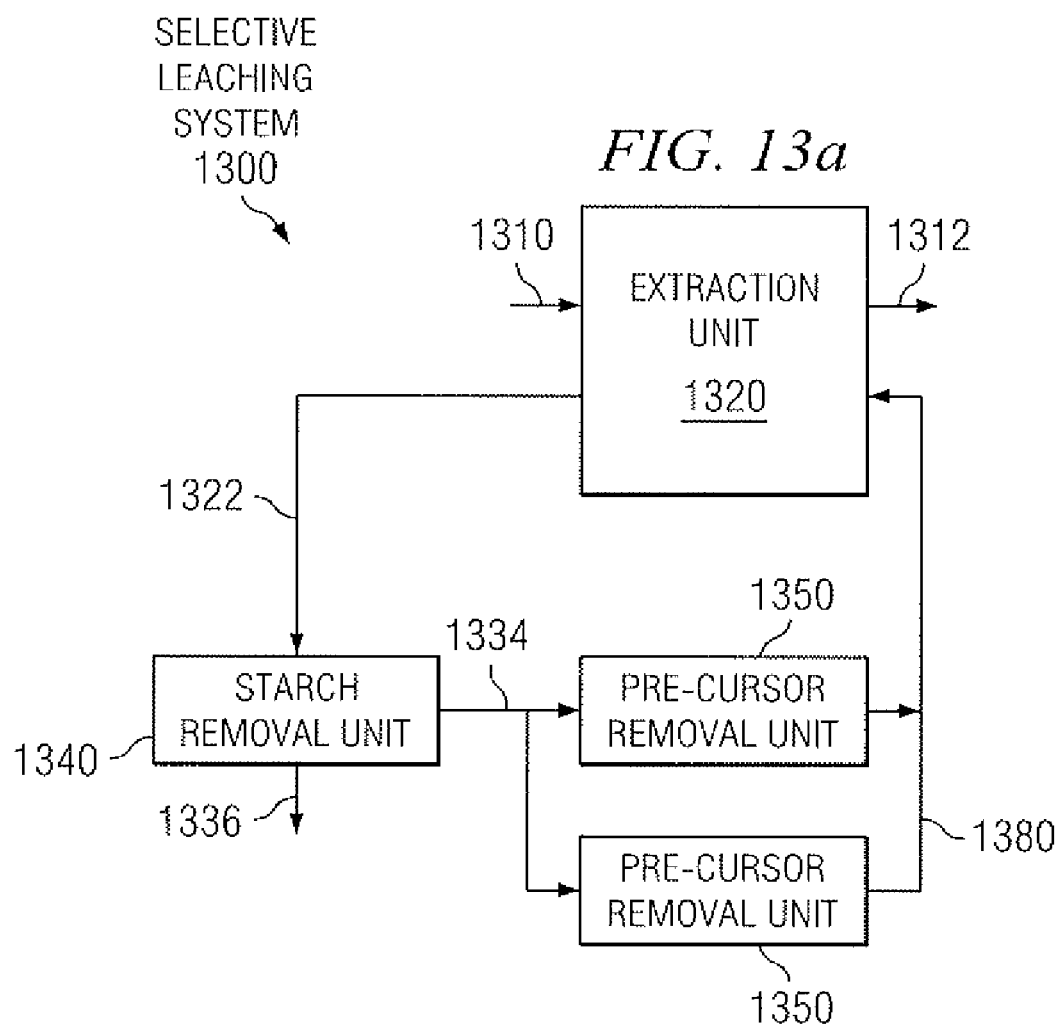
FIG. 13a is a schematic diagram of a system and method for leaching asparagine out of a continuous feed of raw potato pieces according to one embodiment of the present invention.
Figure 13B:
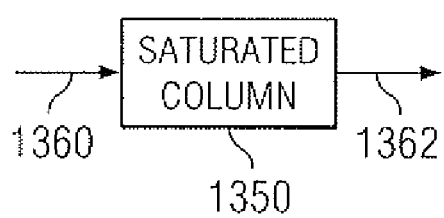
FIG. 13b is a schematic diagram of a unit and method for regenerating a pre-cursor-removing unit saturated with acrylamide pre-cursors according to another embodiment of the invention.

FIG. 13*b* illustrates the regeneration process if required for a resin column that selectively removes asparagine from the solution by binding with the asparagine. When one column's asparagine-removing matter is saturated with asparagine, that column is taken off-line, and the de-starched, post-wash extract 1334 is redirected to the remaining column or columns. A regenerating solution 1360 is sent through the saturated column 1350 to free the asparagine from the surface of the resin. The asparagine-laden regenerating solution 1362 exiting the off-line column 1350 can be discarded, or it can be further processed to isolate the asparagine and recycle the regenerating solution 1360. When most of the asparagine has been stripped out of the column, the flow of regenerating solution 1360 into the column is stopped. A small amount of de-starched, post-wash extract 1334 can then be used to flush out any regenerating solution entrained in the column. At that point, the regeneration is complete, and the column can then be reinstated in the leaching process 1300 shown in FIG. 13*a*.

In an alternative embodiment, the extraction unit operation 1320 can be split into two separate unit operations. The first of these unit operations would involve a washing step similar to the prior art washing step 23 shown in FIG. 2. This washing step would involve water and would be for the purpose of removing excess starch from the surface of the potato slices. The thus-washed potato slices would then proceed to an extractor unit 1320 to be treated with a pre-cursor deficient potato extract 1380 that also contained a concentration of starch sufficient to eliminate or substantially reduce the extraction of additional starch from the potato slices. Under such alternative embodiment, the starch removal unit operation 1340 would occur on a separate stream than that depicted on FIG. 13*a*.

Figure 14:
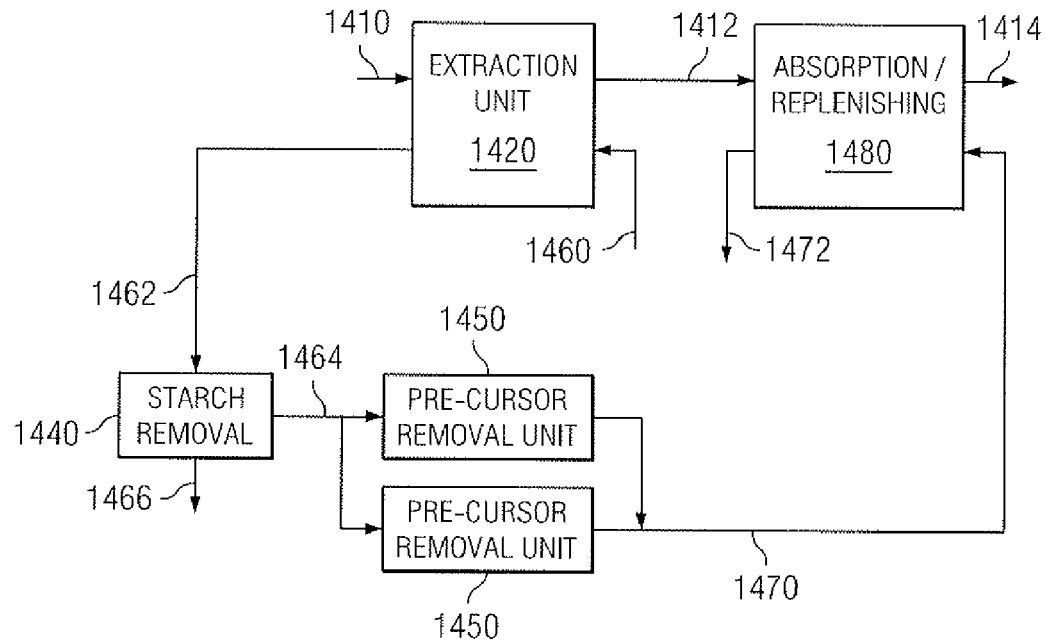
FIG. 14 is a schematic diagram of a system and method for non-selectively leaching water-soluble compounds from a continuous feed of raw potato pieces into a stream of water, removing asparagine from the stream of water, and returning some of the previously-leached water-soluble compounds to the potato pieces according to another embodiment of the invention.

FIG. 14 depicts another embodiment of the invention in which a non-selective leaching system 1400 is used to wash raw potato pieces and remove asparagine. This non-selective leaching system 1400 comprises four main unit operations: 1) an extraction unit 1420 non-selectively leaches water-soluble compounds, including asparagine, out of a potato feed stream 1410 and into a pre-cursor deficient extract 1460; 2) a starch removal unit 1440 removes excess, unbound starch 1466 from the resulting post-wash extract 1462; 3) at least one asparagine removal unit 1450 removes asparagine from the de-starched, post-wash potato extract 1464; and 4) an absorption/replenishing unit 1480 replenishes the treated potatoes 1412 with some of the previously extracted water-soluble compounds.

The extraction unit 1420, starch removal unit 1440, and pre-cursor removal unit(s) 1450 shown in FIG. 14 are constructed and operated in a manner similar to that described with respect to the extraction unit 1320, starch removal unit 1340, and pre-cursor removal unit(s) 1350 shown in FIG. 13*a*. Unlike the selective leaching system 1300 shown in FIG. 13*a*, however, the nonselective leaching system 1400 depicted in FIG. 14 does not require that the untreated potato feed 1410 in the extraction unit 1420 be leached with a potato extract. A continuous stream untreated potato feed 1410 entering the extraction unit 1420 of FIG. 14 can instead be leached with pure water (distilled, de-ionized, or treated by reverse-osmosis) as the pre-cursor deficient extract 1460. Furthermore, as will be understood by reviewing the entire process, the spent potato extract 1472 leaving the last unit operation 1480 can be discarded and does not have to be recycled to the extraction unit 1420. However, the potato spent extract 1472 can be recycled if desired.

In the first unit operation of the non-selective leaching system 1400, a continuous stream of raw potatoes containing acrylamide pre-cursors ("untreated potatoes") 1410 flow from one end of an extraction unit 1420 to the other end while a pre-cursor deficient extract 1460 flows through the extraction unit 1420 in the opposite direction, countercurrent to the flow of untreated potatoes 1410. The pre-cursor deficient extract 1460 typically comprises pure water but can alternatively comprise spent potato extract 1472 exiting from an absorption/replenishing unit 1480 or a combination of both pure water and spent extract 1472.

Unlike the extraction unit 1320 shown in FIG. 13*a* where only asparagine and starch molecules are drawn out of a potato feed 1310, the extraction unit 1420 shown in FIG. 14 non-selectively draws any water-soluble compounds out of an untreated potato feed 1410. Because the pre-cursor deficient extract 1460 contains little or none of the water-soluble compounds contained in the untreated potato feed 1410, such as reducing and non-reducing sugars, starch, and asparagine, the concentration gradients between the untreated potato feed 1410 and the precursor deficient extract 1460 cause the water-soluble compounds in the untreated potato feed 1410 to diffuse into the precursor deficient extract 1460. After washing and leaching, the treated potatoes 1412 exit the extraction unit 1420 and proceed to an absorption/replenishing unit 1480, while the post-wash extract 1462 exits the extraction unit 1420 and proceeds to a starch removal unit 1440.

In the second unit operation of the non-selective leaching system 1400, the post-wash extract 1462, which now contains starch, asparagine, reducing and non-reducing sugars, and other water-soluble compounds, enters a starch removal unit 1440. This unit is constructed and operated in essentially the same manner as described above with respect to the starch removal unit 1340 shown in FIG. 13*a*. The starch removal unit 1440 separates the starch particles from the post-wash extract 1462, and the starch exits the unit as a slurry or paste 1466. The de-starched, post-wash extract 1464 then leaves the starch removal unit 1440 and is transferred to at least one pre-cursor removal unit 1450.

In the third unit operation of the non-selective leaching system 1400, at least one pre-cursor removal unit 1450 removes asparagine in the same manner as described above with respect to the pre-cursor removal unit(s) 1350 in FIG. 13*a*. Similarly, each pre-cursor removal unit 1450 in FIG. 14 is regenerated the same way as each pre-cursor removal unit 1350 shown in FIG. 13*b* is regenerated, if necessary. After asparagine is removed from the de-starched, post-wash extract 1464, the resulting pre-cursor deficient replenishing extract 1470 exits the pre-cursor removal unit(s) 1450 and proceeds to an absorption/replenishing unit 1480.

The fourth unit operation of the non-selective leaching system 1400 returns previously leached water-soluble compounds to the treated potatoes 1412. An absorption/replenishing unit 1480 is used for this purpose and comprises any one of the apparatuses discussed in the several embodiments of the extraction unit 1320 shown in FIG. 13*a*. For example, the absorption/replenishing unit 1480 can comprise a screw-type extractor, a wash-tank type extractor, or a Bollman-type percolation extractor. Although most often used to extract solute from solids into a leaching solvent, these apparatuses can also be used to accomplish the reverse—diffuse solute from solution into solids. Such equipment merely enhances mass transfer between solid and liquid phases. For example, one embodiment of the absorption/replenishing unit 1480 comprises a screw-type extractor. The treated potatoes 1412 from the extraction unit 1420 enter one end of the screw-type extractor 1480 and encounter a countercurrent flow of pre-cursor deficient replenishing extract 1470. Because the entering pre-cursor deficient replenishing extract 1470 has a relatively high concentration of water-soluble compounds (mainly sugars), and the treated potatoes 1412 have a relatively low concentration of water-soluble compounds, the water-soluble compounds diffuse from the pre-cursor deficient replenishing extract 1470 back into the treated potatoes 1412. Thus, the water-soluble solute concentrations in the treated potatoes 1412 increase as the treated potatoes 1412 progress through the absorption/replenishing unit 1480, and the solute concentrations in the pre-cursor deficient replenishing extract 1470 decrease as the pre-cursor deficient replenishing extract 1470 progresses through the unit 1480. The spent extract 1472 exiting the absorption/replenishing unit can be discarded, or it can be recycled as part of the pre-cursor deficient extract 1460 in the extraction unit 1420. The replenished potatoes 1414 exit the unit 1480 with water-soluble solute levels greater than those in the treated potato stream 1412 but lower than the initial levels in the raw, untreated potatoes 1410.

If the spent potato extract 1472 is recycled as the pre-cursor deficient extract 1460 entering the extraction unit 1420, the non-selective leaching system will, over time, operate much like the selective leaching system shown in FIG. 13*a*. As steady-state is approached, the concentrations of water-soluble matter other than asparagine and starch will increase in the pre-cursor deficient extract 1460, and less matter will be leached out of the untreated potato feed 1410. At steady-state, only asparagine and starch are extracted out of the potato feed 1420 and into the pre-cursor deficient extract 1460, rendering the absorption/replenishing 1480 unit superfluous. Thus, another embodiment of the invention involves using the non-selective leaching system 1400 only during start-up, recycling the spent extract 1472 as pre-cursor deficient extract 1460 in the extraction unit 1420, and then transforming the non-selective leaching system 1400 into the selective leaching system 1300 shown in FIG. 13*a* by bypassing the absorption/replenishing unit 1480 after steady-state is reached. This embodiment minimizes the amount of solute matter (such as sugars) that is undesirably leached out of the untreated potatoes 1310, 1410 during start-up. It also decreases the number of treated potato pieces 1312, 1412 that must be discarded during start-up due to intolerably low levels of desired solutes.

In one embodiment, the removal of pre-cursors occurs through leaching by prolonging the blanching step that involves treating whole or sliced potatoes 1410 with hot water 1460 from 100° F. to 150° F. and more preferably about 120° F. to 150° F. with soaking times ranging from about 1 minutes to about 5 minutes and more preferably about 3 minutes to about 5 minutes. The temperature/time relation is important because lower temperatures do not remove sufficient amounts of precursors and higher temperatures remove all components too readily. In one embodiment, the potato slices are blanched in a solution having one or more desirable soluble material additives including but not limited to reducing sugars such as glucose and fructose. The blanching step in accordance with one embodiment of the present invention removes amounts of asparagine to effect up to 95% reduction of acrylamide formation. The de-starched, post-wash extract 1464 which contains leached out components from the blanching step is then cooled to prevent the enzyme from becoming inactivated and mixed with enzyme asparaginase with a concentration ranging from 500 to 100,000 units and more preferably between about 3000 to about 100,000 units per 1.4 liters of solution for 5 to 20 minutes. In one embodiment, the de-starched, post-wash extract 1464 is cooled to a temperature of less than about 70° C. (158° F.) to prevent destruction of asparaginase. In one embodiment, the solution is cooled to a temperature of between about ambient and about 100° F. The asparaginase removes a majority of the asparagine from the de-starched, post-wash extract 1464. Next, in one embodiment, the blanched treated slices 1412 are replenished with desirable soluble matter with the enzyme treated pre-cursor deficient replenishing extract 1470 to infuse back into the slices the rest of the components (without asparagine) to produce replenished potatoes 1414. The infusion step that occurs in the absorption/replenishing unit 1480 may involve either various temperature/time treatments, possibly higher pressures or vacuum. The slices, after these treatments, are fried per normal frying temperature and times to produce chips.

Thirteen comparative tests were conducted under various time and temperature relationships to analyze the asparagine leached from potato slices by the prolonged blanching step. In some embodiments, leaching sugars were reintroduced by soaking at different times and assess the impact on asparagine removal. The results of the tests are provided in Table 3 below.

An additional soaking step in pure water at a lower temperature yielded a greater reduction of asparagine as indicated by tests 8-10 as compared to results found by a single soaking step in tests 2-4. Tests 11-13 reveal that a first soaking step in water at 140° F., followed by cooling the water to 95° F. to prevent the enzyme from becoming inactivated by surrounding the bucket with ice, followed by adding 10,000 units of asparaginase, mixing for 10 minutes and allowing the potato slices to soak removes over 99% of the asparagine in the potato slices. Further, when the final soak step is 30 minutes or longer, as indicated by tests 12 and 13, no detectable amount of asparagine is left in the leached water.

Figure 15:
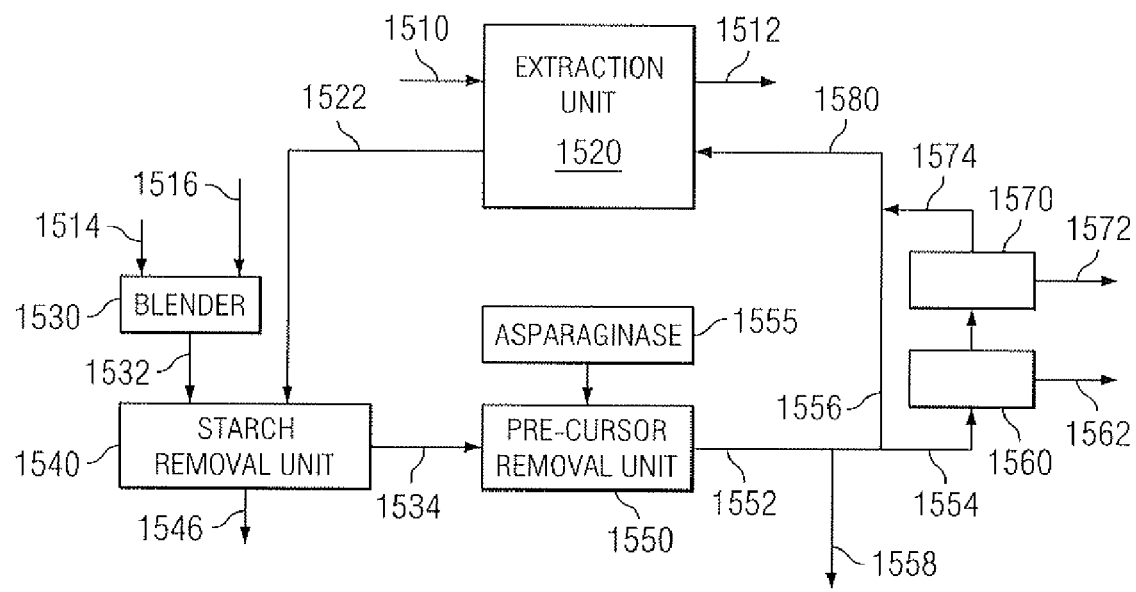
FIG. 15 is a schematic diagram of a system and method adding an enzyme to the de-starched, post-wash extract to provide an acrylamide pre-cursor deficient solution, contacting raw food or untreated potato pieces having a native concentration of asparagine in the acrylamide pre-cursor deficient solution to preferentially leach out the acrylamide pre-cursor from the untreated food pieces such that the raw food piece has a reduced concentration of asparagine that is less than the native concentration, and removing the treated food pieces from the extraction unit.

FIG. 15 is a schematic diagram of a system and method adding an enzyme 1555 to the de-starched, post-wash extract 1574 to provide an acrylamide pre-cursor deficient solution 1580, contacting raw food or untreated potato pieces 1510

TABLE 3

Asparagine Reduction of Blanched Potato Slices

|   | Test Conditions | Slices ASN* ppm | Slices ASN Red. | Leach water ASN* ppm |
|---|---|---|---|---|
| 1 | Control - Soak fot 2 min at ambient temp | 2902 |  | 20 |
| 2 | Soak 15 min at 140° F. | 1353 | 53.4 | 103 |
| 3 | Soak 30 min at 140° F. | 409 | 85.9 | 104 |
| 4 | Soak 60 min at 140° F. | 92 | 96.8 | 148 |
| 5 | Soak 15 min@140° F. in 0.02% Glucose/fructose. Rinse. | 487 | 83.2 | 159 |
| 6 | Soak 30 min@140° F. in 0.02% Glucose/fructose. Rinse | 385 | 86.8 | 137 |
| 7 | Soak 60 min@140° F. in 0.02% Glucose/fructose. Rinse | 114 | 96.1 | 166 |
| 8 | Soak 15 min@140° F./soak 15 min @ 95° F. | 440 | 84.8 | 119 |
| 9 | Soak 15 min@140° F./soak 30 min @ 95° F. | 108 | 96.3 | 174 |
| 10 | Soak 15 min@140° F./soak 60 min @ 95° F. | 117 | 96 | 167 |
| 11 | Soak 15 min@140° F./Cool wash water to 95° F.; add 10,000 units enzyme/mix for 10 min/soak slices for 15 min. | 7 | 99.8 | 150 |
| 12 | Soak 15 min@140° F. Cool wash water to 95° F.; add 10,000 units enzyme/mix for 10 min/soak slices for 30 min. | 9 | 99.7 | 0 |
| 13 | Soak 15 min@140° F./Cool wash water to 95° F.; add 10,000 units enzyme; mix for 10 min/soak slices for 60 min. | 17 | 99.4 | 0 |

*Avg. of 2 samples

For each test in the table above, 200 grams of potatoes were peeled, sliced to a thickness of 0.053 inches, and soaked in 5 L of water. The slices were then soaked under various conditions to leach out asparagine. After each test, the potato slices and of the leach water were sampled for asparagine. Thus, in the Test 1 control sample, 200 grams of potato slices having a thickness of 0.053 inches were soaked for two minutes in 5 liters pure water at ambient temperature (about 70° F.). Two potato slices tested had an average asparagine concentration of 2,902 ppm of asparagine and the leach water had 20 ppm of asparagine. As indicated by tests 2-4, longer soak times yielded a greater reduction of the concentration of asparagine in the soaked or leached potato slices and a greater concentration of asparagine in the leach water. As indicated by tests 5-7, soaking the potato slices in a solution having 0.02% reducing sugars resulted in a greater (test 5 was greater than test 2) or similar reduction (tests 3 and 6 and tests 4 and 7 were comparable) of the asparagine concentration of potato slices than soaking at the same time and temperature in pure water, This discovery is important because it demonstrates that desired selective leaching can be achieved as effectively or more effectively than non-selective leaching.

having a native concentration of asparagine in the acrylamide pre-cursor deficient solution 1580 to preferentially leach out the acrylamide pre-cursor from the untreated food pieces 1510 such that the raw food piece has a reduced concentration of asparagine that is less than the native concentration, and removing the treated food pieces 1512 from the extraction unit 1520. As illustrated by the leaching system 1500 in FIG. 15, the washing phase can be modified to include a continuous process for leaching acrylamide precursors out of a continuous potato feed 1510.

In one embodiment, five main unit operations are used to wash the potatoes and selectively extract the main pre-cursor, asparagine: 1) a blender 1530 makes a potato extract 1532; 2) a starch removal unit 1540 removes excess, unbound starch and potato solids 1546; 3) at least one asparagine removal unit 1550 removes asparagine from the de-starched, post-wash potato extract 1534, which is then recycled (as asparagine-deficient extract 1552) to continuously wash and leach the untreated potato feed 1510; and 4) at least one reaction product removal unit 1560 can be used to avoid build-up of reaction products such as ammonia and aspartic acid that can result from reacting asparagine with asparaginase in the pre-cursor removal unit 1550; and 5) an extraction unit 1520 leaches asparagine out of an untreated potato feed stream 1510 and into an asparagine-deficient potato extract 1580.

In the first unit operation, used principally during start-up, or as a make-up stream, raw peeled and sliced potatoes 1514 and water 1516 are added to a blender 1530 to make potato puree or potato extract 1532. In this and other embodiments involving selective leaching of asparagine, it is desirable for the extract concentration levels (other than asparagine, excess starch, and undesirable impurities) to be as close to equilibrium with the corresponding concentration levels in the untreated potato feed 1510 to minimize concentration gradients that can draw desirable soluble matter out of the untreated potato feed 1510 during leaching. Thus, in one embodiment, if the potato slices are not pre-washed, there are only two major concentration gradients that should exist between the untreated potato feed 1510 and the asparagine-deficient extract 1580 entering the extraction unit 1520: one drawing asparagine from the untreated potato feed 1510 to the asparagine-deficient extract 1580, and another drawing starch from the untreated potato feed 1510 to the asparagine-deficient extract 1580. Consequently, the amount of water 1516 used to make the extract 1532 is preferably minimized. In one embodiment, the extract comprises between about 300 grams to about 1,000 grams of potato per 1.4 liters of water. In one embodiment, the water comprises between about 500 units and about 100,000 units per 1.4 liters. Furthermore, it may be desirable to use a heated asparagine-deficient extract 1580. Because the solubility of asparagine in water increases with temperature, higher wash/leaching temperatures increase the amount of asparagine that can be leached with a given flow rate of extract. For example, typical leaching solution temperatures ranging from about 100° F.-about 150° F. can be used.

Referring again to FIG. 15, as the asparagine-deficient potato extract 1580 contacts the untreated potatoes 1510 in the extraction unit 1520, asparagine and starch are leached into the asparagine-deficient extract 1580. The same extraction units discussed above with respect to FIG. 13a can be used in the embodiments depicted in FIG. 15.

After the post-wash extract 1522 exits the extraction unit 1520, it can be transferred to the starch removal unit 1540. The same starch removal units discussed above with respect to FIG. 13a can be used in the embodiments depicted in FIG. 15. In the next unit operation, the de-starched, post-wash extract 1534 enters at least one pre-cursor removal unit 1550 where the acrylamide pre-cursors are removed.

The pre-cursor removal unit 1550 comprises one or more asparaginase 1555 injection ports. In one embodiment, the pre-cursor removal unit 1550 comprises a continuous mixer. Sufficient asparaginase 1555 should be added such that the asparagine concentration in the asparagine-deficient exit stream 1552 comprises less than about 50% and more preferably less than about 90% of the asparagine concentration of the de-starched post-wash extract 1534.

The asparagine-deficient exit stream 1552 will have reaction products, namely ammonia and aspartic acid as a result of the asparaginase reacting with the asparagine. It is desirable in a continuous process to remove some or all of the reaction products prior to entering the extraction unit 1520 to maintain a favorable preferential or selective asparagine driving force out of the untreated potatoes 1510 and minimize any undesirable collateral effect such reaction products may have on the quality and characteristics of the treated potatoes 1512 exiting the extraction unit 1520. Consequently, several techniques can be used alone or in conjunction to lower the concentration of reaction products in the asparagine-deficient extract 1580 entering the extraction unit 1520.

In one embodiment, an amount 1558 of the asparagine-deficient exit stream 1552 is removed from the leaching system 1500 and can be routed to a waste water stream. In one embodiment, the potato extract 1532 make-up stream entering the leaching system 1500 is proportional or equal to the amount 1558 of asparagine-deficient extract that exits the leaching system 1500.

In one embodiment, the asparagine-deficient exit stream 1552 is divided into a by-pass stream 1556 and a slip stream 1554 that is routed to one or more reaction product removal units. In one embodiment, an ammonia removal unit 1560 preferentially removes ammonia 1562 from the asparagine-deficient slip stream 1554. The slip stream 1554 can comprise about 0% to about 100% of the flow of the asparagine-deficient extract stream 1552. The slip stream 1554 can be set to operate intermittently such that all or a portion of the asparagine-deficient extract stream 1552 is routed to one or more reaction product removal units 1560 for a selected amount of time. For example, for every hour of operation of the leaching system 1500, the asparagine-deficient slip stream 1554 may operate for about 30 consecutive or intermittent minutes and may process all or portion of the asparagine-deficient extract stream 1552.

In one embodiment, the ammonia removal unit 1560 can remove ammonia by one or more ammonia removal methods alone or in combination. The ammonia removal method can be selected from heating the stream, reducing the pressure of the stream, bubbling a gas such as air, steam, or nitrogen through the stream, adjusting the pH of the stream, and using an ion exchange resin to selectively remove ammonia from the stream.

Ammonia in an aqueous solution is present as an equilibrium system defined by:

$$NH_4^+ \Leftrightarrow NH_{3(g)} + H^+$$

Techniques available for the removal of ammonia from aqueous streams can normally only recover either the ionic ($NH_4$) or the gaseous form of ammonia ($NH_3$). Because the system is in equilibrium, removal of the gaseous form of ammonia causes more of the ionic form to convert into the gaseous form, thereby shifting the above reaction towards the right. Ammonia in the gaseous form is also favored under basic conditions, since the ionic form of ammonia will try to establish equilibrium. Because heat can volatilize the ammonia gas from solution, a heated solution of ammonia will also shift the above reaction towards the right. Any gaseous ammonia in the headspace of a solution will also have an impact on the ammonia gas in solution. Consequently, removing the ammonia gas from the headspace by for example use of a vacuum or other depressurization method can also help to volatilize the ammonia gas in solution, which will shift the reaction towards the right. Ammonia can also be removed by other known methods disclosed by U.S. Pat. No. 6,838,069 so long as the methods are food-safe. For example, the ammonia can be contacted with a sorbent that is a solid metal hydroxide so as to load ammonia on the sorbent and the sorbent can be regenerated with a weak acid. Consequently, in one embodiment, the ammonia removal unit 1560 can comprise two units; one unit for regeneration and one unit for ammonia removal.

In one embodiment, an aspartic acid removal unit 1570 can remove aspartic acid 1572 by one or more aspartic acid removal methods alone or in combination. The aspartic acid removal method can be selected from using an ion exchange resin to selectively remove aspartic acid from the stream, filtering with an ultra-filtration membrane, electrophoresis, and adjusting the pH of the stream.

An ion exchange resin in the ammonia removal unit 1560 and/or the aspartic acid removal unit 1570 can be used in a packed bed. Alternatively, the ion exchange resin can be used in a batch-continuous operation where resin is placed into a vat and mixed with the slip stream 1554 and the resin absorbs the reaction pre-cursors and the resin can be removed and regenerated.

In one embodiment, the pH of the slip stream 1554 is lowered to precipitate aspartic acid. The precipitate can then be removed by centrifuge, hydroclone, filtration, or other suitable means. In one embodiment, the pH is adjusted to a range of between about 4 and about 6 and more preferably between about 4.5 and about 5.5. An ultrafiltration membrane can be used in alone or in combination with a pH adjustment to filter out the aspartic acid. The resultant purified pre-cursor deficient potato extract 1574 having been routed through the ammonia removal unit 1560 and/or the aspartic acid removal unit 1570 will have fewer reaction products or by-products (e.g., less ammonia and/or aspartic acid) than the asparagine deficient exit stream 1552. The purified pre-cursor deficient potato extract 1574 can mixed with the by-pass stream 1556 and become the asparagine-deficient potato extract 1580.

Next, a stream of peeled and sliced potatoes containing acrylamide pre-cursors ("untreated potatoes") 1510 enters an extraction unit 1520, similar to the prior art washing step 23 of FIG. 2, where the potatoes are contacted with a pre-cursor deficient potato extract 1580. The asparagine-deficient potato extract 1580 comprises a stream of water containing all of the water-soluble potato components with the exception of the particular acrylamide pre-cursor to be removed from the untreated potato feed 1510. Thus, at steady-state in the preferred embodiment, the asparagine-deficient potato extract 1580 comprises an aqueous solution or suspension of all the water-soluble potato solids and compounds except asparagine. The potato extract generally includes water-soluble compounds such as reducing and non-reducing sugars, starches, and various amino acids. At steady-state, the concentrations of water-soluble compounds in the asparagine-deficient extract 1580, other than starch and asparagine, are either in or nearly in equilibrium with the corresponding concentrations of water-soluble compounds in the untreated potato feed 1510. One point that must be kept in mind when reviewing the effects of manipulating various parameters of unit operations, such as those effects shown in FIGS. 13 and 14, is that all of these adjustments will have some collateral effect on the quality and characteristics of the final product. Consequently, any adjustments made in any of the unit operations must be carefully selected in order to arrive at the product exhibiting the desired final characteristics. These characteristics include color, flavor, mouth-feel, density, smell, and the shelf-life aspects of the finished product.

Figure 5:
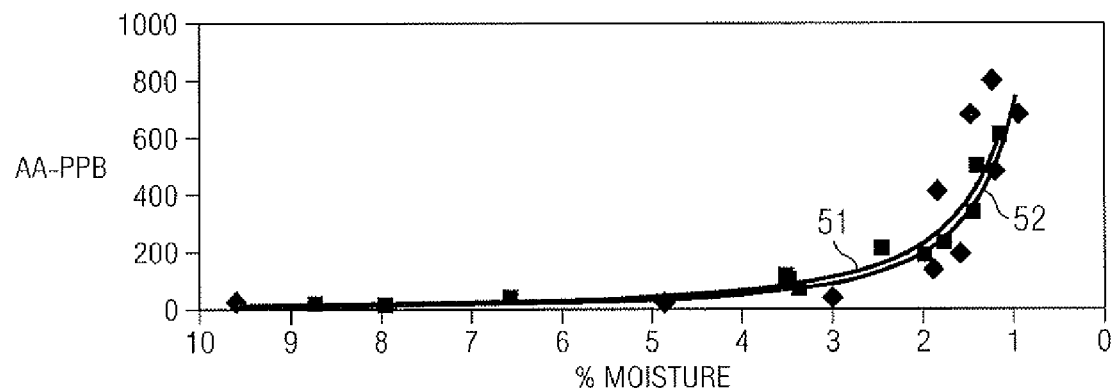
FIG. 5 is a graph showing the relationship between acrylamide concentration and final fried product moisture wherein the acrylamide concentration in ppb is on the y-axis, and the moisture content in weight percent is on the x-axis.

FIG. 5 focuses on another aspect of unit operations and shows the effect of decreasing moisture level in the chip during the cooking stage. Referring back to FIG. 2, the cooking step 24 is a unit operation that typically involves cooking sliced potato chips in a continuous oil flyer at high temperatures. Returning to FIG. 5, the graph thereon reflects on the horizontal or x-axis the moisture level of the final chip product. The vertical or y-axis is again labeled in ppb of acrylamide ("AA") found in the final product. A number of data points are then plotted showing a percent moisture versus the acrylamide level of the final chip. Two different frying temperatures were used with diamond symbols representing chips fried at about 178° C. (353° F.) while square symbols are used to represent data points for chips fried at about 149° C. (300° F.). The line plots 51, 52 are curve-fitted to the data points in order to establish a trend. The curve-fitted line plots 51, 52 follow the general equation: $y=cx^b$, where "y" represents the acrylamide level, "c" is a constant, "x" is the moisture level, and "b" is the exponent of "x." The first line plot 51 relates to the 149° C. (300° F.) frying temperature data points. The second line 52 relates to the data points plotted for the 178° C. (353° F.) frying temperature. As can be seen in FIG. 5, acrylamide levels remain very low at chip moisture levels above about 3% moisture by weight regardless of frying temperature.

Figure 6:
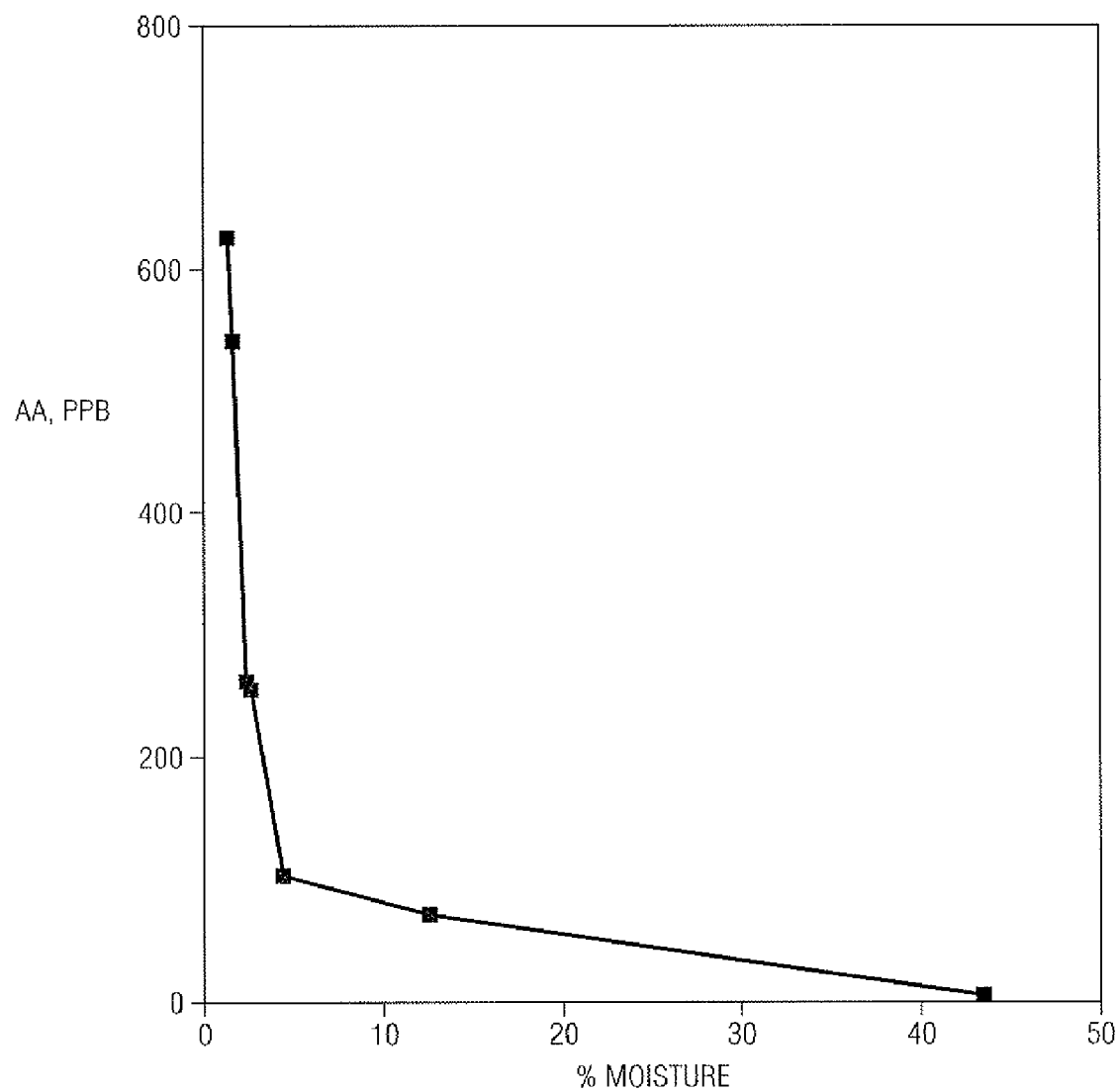
FIG. 6 is a graph showing the relationship between acrylamide concentration and final baked product moisture wherein the acrylamide concentration in ppb is on the y-axis, and the moisture content in weight percent is on the x-axis.

Whereas FIG. 5 shows the relationship between acrylamide levels and moisture content in fried potato slices, FIG. 6 depicts the same relationship in baked potato chip products made from a dry mix. The vertical axis of the graph in FIG. 6 shows acrylamide concentrations, while the horizontal axis shows moisture levels by weight. While the acrylamide concentrations tend to be higher in baked potato chip products than in fried potato slices, FIGS. 5 and 6 both show that the acrylamide concentrations remain fairly low in cooking potato products until the moisture level falls below about 3%.

What is made apparent by FIGS. 5 and 6 is that acrylamide levels in potato chips cooked in a typical fryer increase rather dramatically once the moisture level falls below 3% moisture by weight, at which point it seems there is not enough moisture left to keep the product temperature below an acrylamide formation temperature. For example, FIG. 5 illustrates that the level of acrylamide found in the final product is relatively low when the moisture level of the chip during the cooking unit operation is 3% by weight or greater, regardless of the exposure to high-temperature cooking environments. FIGS. 5 and 6 demonstrate that moisture level is a useful additional parameter in a unit operation that can be adjusted for the reduction of acrylamide formation in the final product.

Unfortunately, the moisture level in a finished potato chip should ideally be below about 2%, and preferably between about 1.3 and 1.4%. Anything higher than 2%, and even higher than 1.4% can lead to staling and microbial spoilage issues in the packaged product, as well as organoleptic consequences, for example, taste, texture, etc. However, changes in color, taste, and consistency of the final product can be adjusted by various means. In addition, it may be possible to counter the consequences of finishing the food product with a higher moisture content by adjusting various factors in the pre-packaging step, such as extending fryer hoods, covering conveyors to the packaging machine, dehumidification of the plant environment, and various factors in the packaging, such as packaging materials, films, bags and seals. Thus, according to another embodiment of the disclosed method for reducing acrylamide formation in thermally processed foods, a further unit operation comprises finishing the food product as it emerges from its final cooking step at a moisture content, for example, at about 1.4% by weight, about 1.6% by weight, about 1.8% by weight and about 2% by weight, or at any % moisture weight between 1.4% and 2%.

However, it is important to note that other potato products have been known to form significant amounts of acrylamide even at relatively high moisture content. For example, French fries, which typically leave a fryer with over 15% moisture by weight, have been shown to develop significant amounts of acrylamide during cooking. This suggests that acrylamide formation depends on the temperature (particularly the surface temperature) of a cooking product rather than overall moisture content. In fact, studies have shown that acrylamide does not form in significant amounts until the necessary reactants are exposed to temperatures of about 250° F./120° C. It thus appears that a potato product containing acrylamide pre-cursor compounds will not form significant amounts of acrylamide until, upon cooking, the product temperature, which may differ significantly from the cooking medium's temperature, rises above about 120° C. (250° F.). Nevertheless, the moisture content of such product can be a good indication of whether the product temperature has risen above a formation temperature for acrylamide.

It has been theorized by those of ordinary skill in the art that moisture in the product helps keep the internal product temperature below the acrylamide formation temperature, even while in a relatively high-temperature environment. When most of the moisture is removed, however, high-temperature surroundings can cause the product temperature to rise above the acrylamide formation temperature. It is important to keep in mind, though, that not all portions of a cooking product share the same internal temperature. French fries, for example, can be fairly thick when compared to potato slices and thus tend to have a larger moisture gradient between the inner and outer portions of the product. Consequently, it is possible for a French fry being cooked to have a fairly high surface temperature even though its interior moisture content is high. In contrast, a potato slice is thinner and tends to have more consistent moisture levels throughout the slice during cooking. Thus, at least for thin products such as potato slices or fabricated potato pieces, moisture level can still be a good gauge of its internal temperature. This also holds true for non-potato products made from corn, barley, wheat, rye, rice, oats, millet, and other starch-based grains. Furthermore, continuous cooking equipment can be designed with different temperature stages that progressively decrease from higher to lower temperatures as the moisture content of the cooking product decreases. This enables moisture to be removed rapidly without allowing the product temperature to rise above the acrylamide formation temperature, Consequently, one element of this invention involves dividing the cooking unit operation (the fourth unit operation 24 shown in FIG. 2) into at least two separate heating steps. A first heating step occurs at elevated temperatures to reduce the moisture level to some point near but above 3% by weight. The product is then finished to the desired moisture level of about 1-2% by weight, but preferably about 1.4% by weight, with a lower-temperature cooking step having a temperature below about 120° C. (250° F.). However, the process modifications described herein are not limited to prior art processes for cooking potato slices such as the one disclosed in FIG. 2. These modifications are also applicable in processes for making fabricated products derived from potato, corn, wheat, rye, rice, oats, millet, and other starch-based grains. For example, these process modifications can be used to reduce acrylamide formation in fabricated potato and corn products, cereals, cookies, crackers, hard pretzels, and breads, to name a few. Note that the terms "modified cooking step" and "modified cooking unit operation" are meant to include not only FIG. 2's prior art method for cooking potato slices but also prior art methods for preparing other food products in which it is desirable to reduce acrylamide formation. In addition, the term "potato-based pieces" is meant to include both raw potato slices and fabricated potato pieces derived from potato starch or dough.

Each heating step can be accomplished using various heating methods. For example, the first heating step can comprise atmospheric frying, vacuum frying, microwave-assisted frying, or baking. The first heating step, however, can alternatively comprise any other method for cooking the product and lowering its moisture level with primary consideration given to production efficiencies such as residence time, energy costs, equipment capital costs and available floor space. When the first heating step involves frying the product, the first heating step is often called "par-frying," as such frying only partially cooks the product until its moisture content is lowered to some point near but above 3% by weight. The second heating step can comprise vacuum frying, low temperature oven drying, vacuum oven drying, or any method of cooking that maintains cooking temperatures required by the second heating step. However, other methods can also be used to reduce moisture content while avoiding the low-moisture/high-temperature conditions most favorable to acrylamide formation as long as the product temperature remains below the acrylamide formation temperature of about 120° C. (250° F.). The second heating step is often called "finish-frying" or "finish-drying," as the moisture content is further reduced to the final desired level.

Figure 7A:
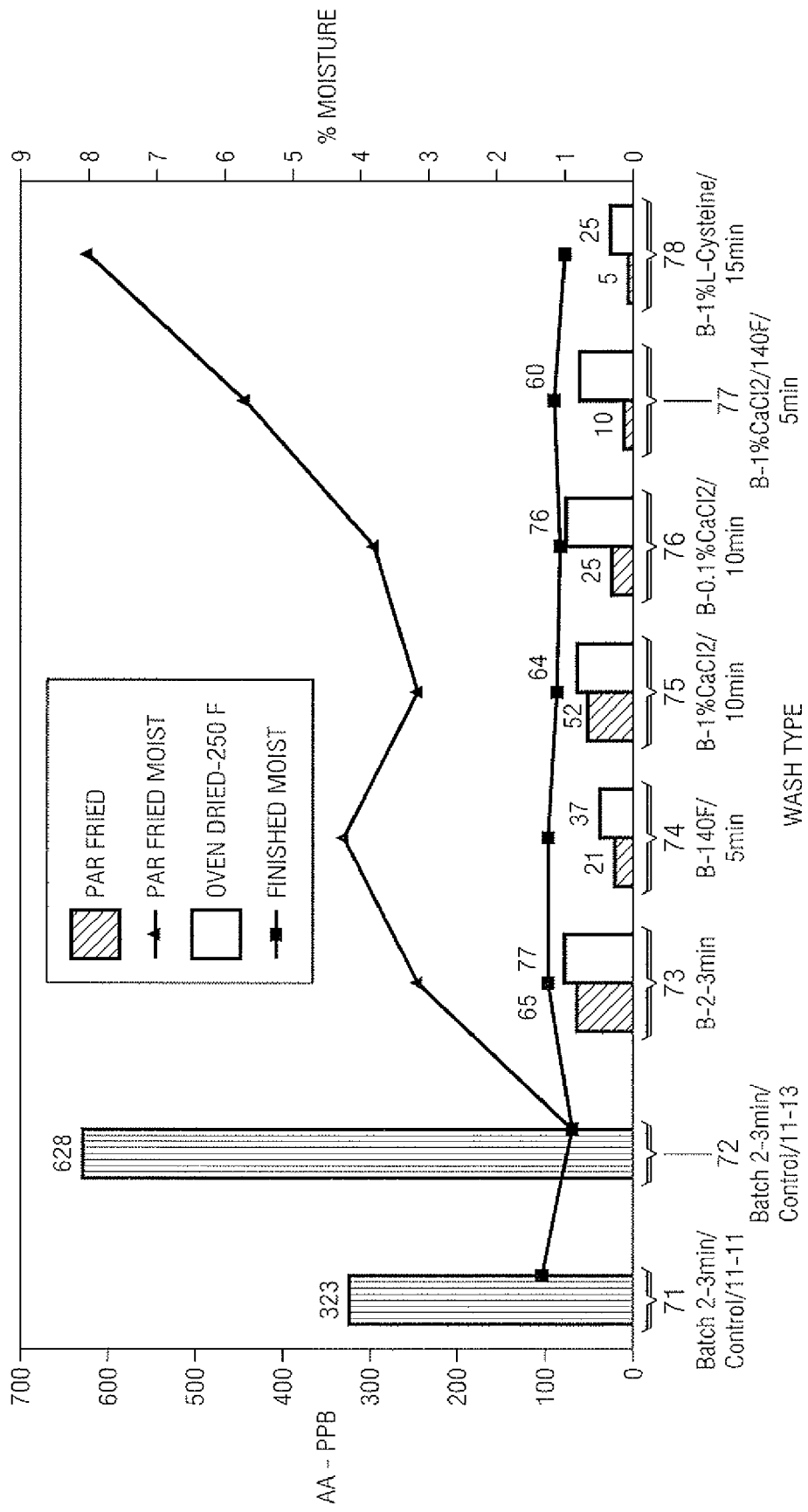
FIG. 7a is a graph showing the acrylamide concentrations in potato test samples that were par-fried and then oven-dried at about 120° C. (250° F.) after various methods of contacting, wherein acrylamide concentrations are shown on the y-axis in ppb, and the various contact methods are described on the x-axis.
Figure 7B:
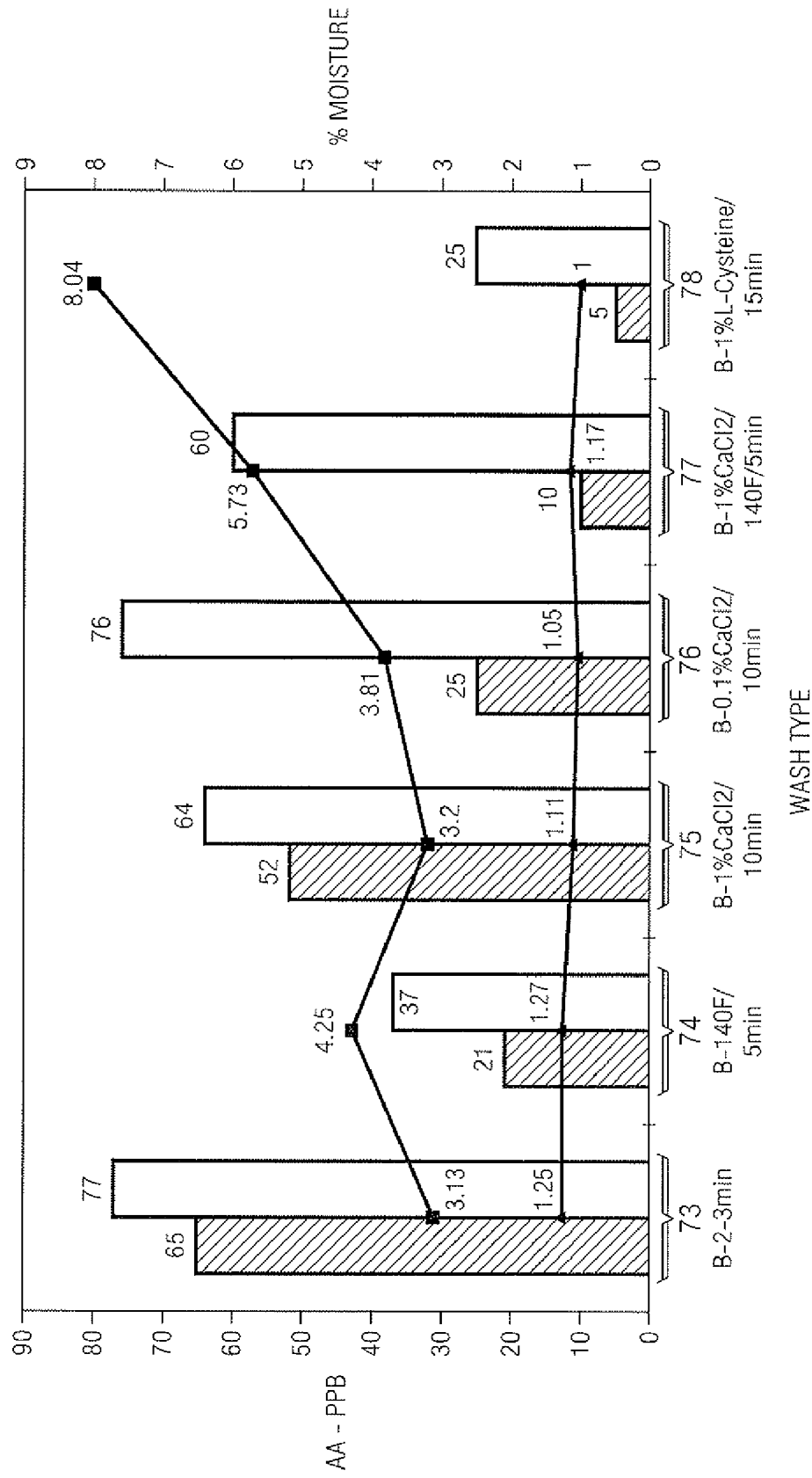
FIG. 7b is a graph showing the last six data points of FIG. 7a on a narrower acrylamide concentration scale.
Figure 8:
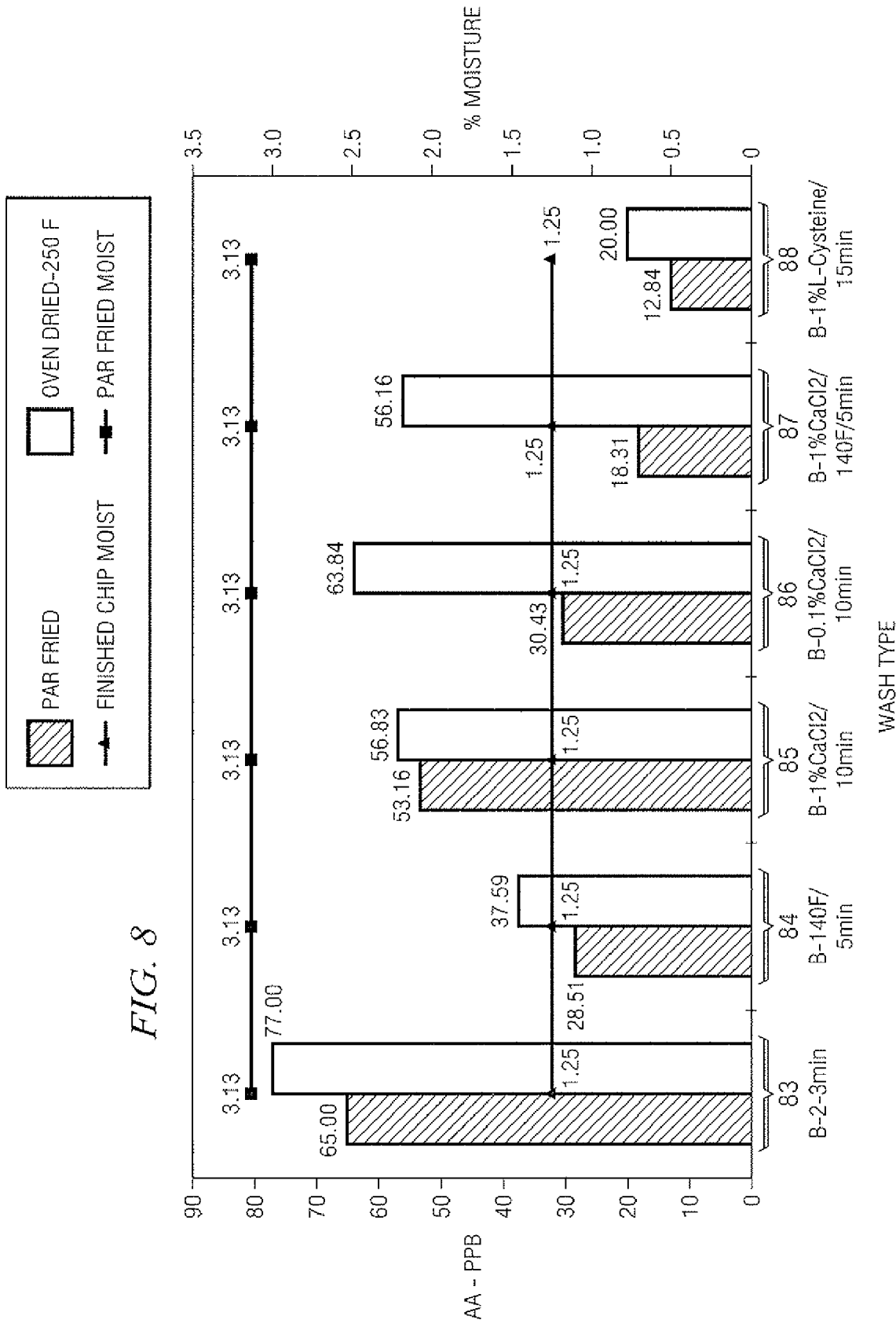
FIG. 8 is a graph showing the data from FIG. 7a after normalizing the par-fry data to a moisture level of about 3.13% by weight and normalizing the oven-dry data to a moisture level of about 1.25% by weight.

By modifying the washing step 23 and/or the cooking step 24 of the process for making potato chips shown in FIG. 2, acrylamide levels in the final product can be reduced significantly without adversely affecting product quality and final characteristics. In one preferred embodiment, a potato-chip-making process using fresh chipping potatoes combines traditional peeling, slicing, and washing steps with a modified cooking unit operation involving par-frying at about 165 to about 182° C. (330-360° F.) for about 1-3 minutes, followed by oven-drying below about 120° C. (250° F.) until the chip moisture level is reduced to about 1.4% by weight. In tests using this preferred embodiment, acrylamide levels below 130 ppb are achieved. This preferred embodiment achieves a balance between a high level of acrylamide reduction with an acceptable change in product quality associated with the necessary process modifications. However, other embodiments are possible. FIGS. 7a, 7b, and 8 show various examples of combinations of washing modifications comprising contacting with an aqueous solution and cooking modifications that reduce final acrylamide levels from those levels resulting from the prior art methods. For example, a final acrylamide level of more than 300 ppb is reduced to less than 100 ppb. Although FIGS. 7a, 7b, and 8 involve embodiments for processing raw potato slices, the modified washing methods used in those embodiments can also apply to other types of raw foods in which acrylamide reduction is desirable, such as sweet potatoes, yams, and plantains. Likewise, the cooking modifications used in those embodiments can also apply to other fried food products such as fried tortillas, fried plantains, fried sweet potatoes, and fried yams.

FIG. 7a depicts the resulting acrylamide levels of potato chips made from combining several different embodiments of a modified washing step comprising contacting with one particular embodiment of a modified cooking step. The modified cooking step of FIG. 7a comprises partially frying ("par frying") potato slices at about 179° C. (353° F.) for approximately one to three minutes in a first heating step, then oven-drying the potato slices at about 120° C. (250° F.) until the moisture content is reduced to approximately 1.3% by weight in a second heating step. The advantage of par-frying followed by oven-drying is that the low-moisture/high-temperature conditions most favorable to acrylamide formation can be avoided while still producing final products that are organoleptically similar to traditionally fried products. However, extensive oven-drying can give the product a dry-mouth feel and may cause product scorching that is difficult to mask.

The vertical or y-axis of the graph in FIG. 7a shows acrylamide concentrations in ppb, while the horizontal or x-axis is labeled to show the parameters of each embodiment of the modified washing step comprising contacting the potato slices with an aqueous solution. Each data point shows a pair of vertical bars: the left bar represents acrylamide concentrations after contacting and par-frying while the right bar represents acrylamide concentrations after oven-drying. Reading left to right, the first data point 71 of FIG. 7*a*, like that of FIGS. 3 and 4, is a base sample involving a two to three minute water wash at ambient temperature, after which the sample is then atmospherically fried to roughly 1.3% moisture by weight. The second data point 72 is like the first except the sample is fried to about 1.0% moisture. Note that the first and second samples 71, 72 developed about 320 ppb and 630 ppb of acrylamide, respectively. The third data point 73 involves the same two to three minute ambient water wash, but the sample is then par fried to slightly above 3% moisture and oven-dried to about 1.3% moisture. The left and right bars show that the sample exited the par-frying step with a relatively low acrylamide concentration of about 65 ppb and gained less than 15 ppb in the oven-drying step. The fourth data point 74 involves an aqueous solution comprising water contacting the potato slices for a five minute contact time at about 60° C. (140° F.), followed by the par-frying and oven-drying steps of the modified cooking unit operation. This five-minute, 60° C. (140° F.) contact combined with the par-frying and oven-drying steps resulted in an even lower final acrylamide concentration of less than 40 ppb.

The samples contacted with calcium chloride solutions 75, 76, 77 all produced acrylamide levels higher than that produced by the sample 74 contacted with pure water for five minutes at about 60° C. (140° F.). However, the final acrylamide levels of all such samples were still below 80 ppb, which is significantly lower than the 320 ppb in the base sample.

The last data point 78 involves a 15-minute contact with an aqueous solution comprising 1% L-cysteine. Interestingly, of the several contacting methods shown in FIG. 7*a*, this contacting method produced the lowest concentration of acrylamide. This contacting method, however, also required the longest contact time of the various methods shown in FIG. 7*a*. Although using 1% L-cysteine 78 as the aqueous solution for contacting resulted in the lowest level of acrylamide in the final product, other factors must be considered, such as the effect of such a long contact time on product quality, as well as the expense of increasing contact time.

FIG. 7*b* shows the last six data points 73, 74, 75, 76, 77, 78 of FIG. 7*a* on a graph with a narrower acrylamide concentration scale.

In FIG. 8, the results shown in FIG. 7*b* have been normalized to depict the acrylamide levels that could be expected if the test samples were fried to a moisture level slightly above 3% by weight and then oven-dried at about 120° C. (250° F.) to a standardized moisture level of about 1.3% by weight. The acrylamide levels are normalized in the same manner described above with respect to FIG. 4. When comparing the results 83, 84, 88 shown in FIG. 8 with those of similar experiments 41, 43, 45 shown in FIG. 4, one can see that dividing the cooking unit operation into a first high-temperature heating step and a second lower-temperature heating step significantly reduces acrylamide levels. Whereas FIG. 4 shows that frying in a traditional manner to a standardized 1.32% moisture level by weight should result in acrylamide concentrations ranging from slightly above 100 ppb to over 400 ppb, FIG. 8 shows that par-frying and oven-drying to the same standardized moisture level should result in significantly lower acrylamide concentrations under 100 ppb. The cumulative benefit of combining both a modified washing unit operation comprising a contacting step with a modified cooking unit operation is particularly apparent when comparing the about 54° C. (130° F.)/5 min contact data point 43 of FIG. 4 and the about 60° C. (140° F.)/5 minute contact data point 84 of FIG. 8 with the base data point 41 of FIG. 4. As discussed above with respect to FIG. 4, increasing the contacting time from 2-3 minutes to 5 minutes and increasing the contacting temperature from ambient to about 54° C. (130° F.) causes the acrylamide level in the final product to decrease from about 330 ppb to approximately 230 ppb. The second data point 84 of FIG. 8 shows that the final acrylamide level can be further reduced to less than about 40 ppb when a similar 5-minute, about 60° C. (140° F.) contacting step is followed by a modified cooking unit operation involving par-frying and oven-drying.

Figure 9:
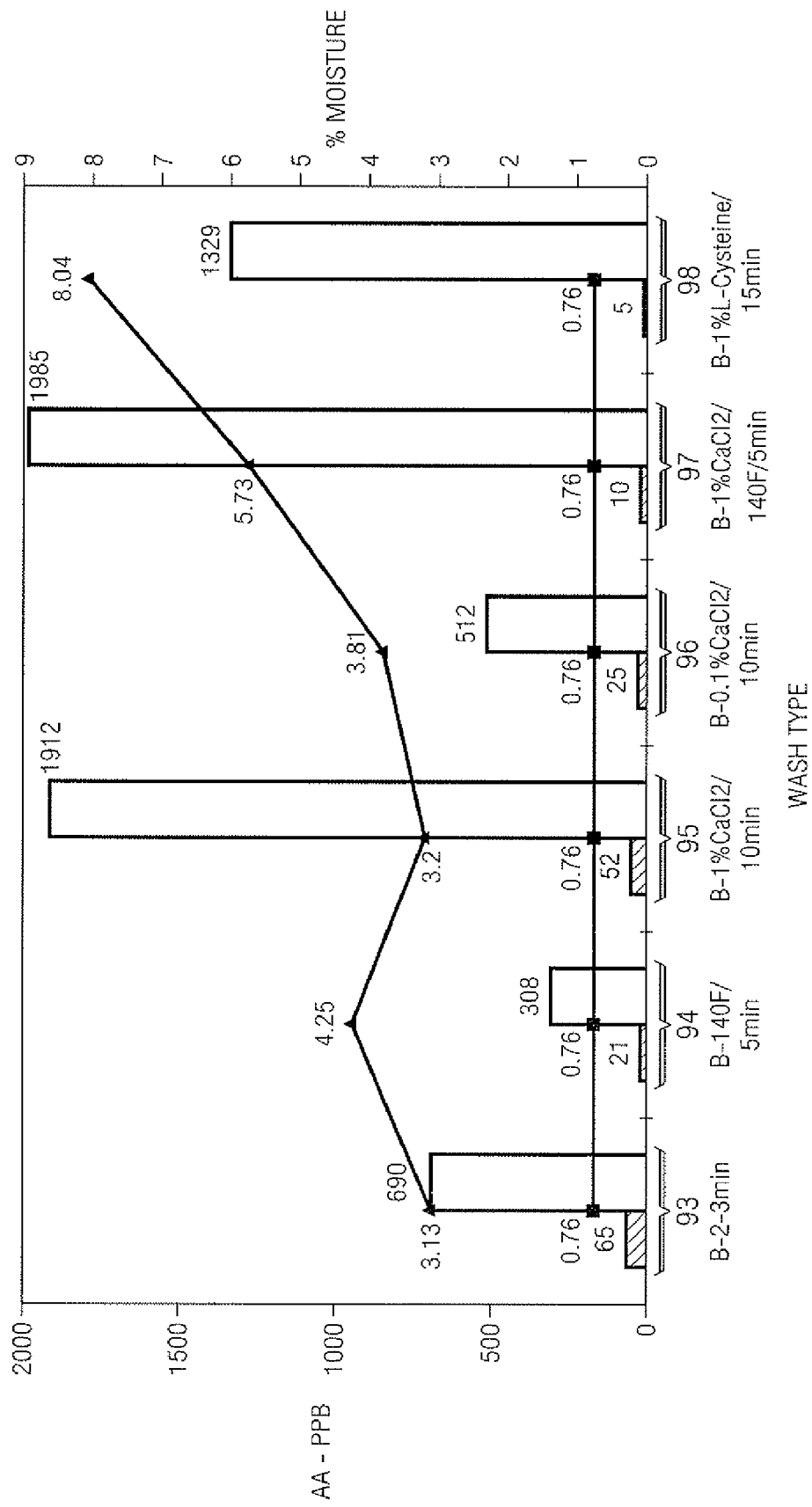
FIG. 9 is a graph showing on the y-axis in ppb: 1) the acrylamide levels of potato test samples that were contacted in the various ways shown on the x-axis, then par-fried at about 178° C. (353° F.), and 2) the acrylamide levels of those same potato test samples after oven-drying at about 178° C. (350° F.), normalized to a moisture level of about 0.76% by weight.

FIG. 9 shows the dramatic increase in final acrylamide concentrations that results from using an oven-drying temperature above about 120° C. (250° F.). In FIG. 9, the test samples were contacted and then par-fried in the same manner as in FIG. 7*b*, but the samples were then oven-dried at about 176° C. (350° F.) rather than about 120° C. (250° F.). The final acrylamide concentrations of the test samples were then normalized to show the expected acrylamide levels upon reaching about 0.76% by weight (which is the final moisture content that was reached in the base-point/standard two-to-three minute water wash shown as the first data point). Comparing the second data point 74 of FIG. 7*b* with the second data point 94 of FIG. 9, for example, increasing the oven-drying temperature from about 120° C. (250° F.) to about 176° C. (350° F.) increased the acrylamide concentration from slightly below 40 ppb to approximately 270 ppb. This oven-drying temperature increase similarly caused the acrylamide concentrations of the other test samples to dramatically increase from below 100 ppb to over 500 ppb. Another test sample (not shown) was washed to remove surface starch, par-fried at about 176° C. (350° F.) to a moisture content of between about 3-5% by weight, and then dried in a commercial Wenger oven at about 132° C. (270° F.) to a final moisture content of about 1.3% by weight, resulting in an acrylamide level of about 270 ppb. The results 93, 94, 95) 96, 97, 98 shown in FIG. 9, as well as the results from the test sample oven-dried at about 132° C. (270° F.), thus illustrate the advantages of keeping the cooking and/or drying temperature of the product less than or equal to about 120° C. (250° F.) when the moisture content falls below approximately 3% by weight. This principle applies not only to raw potato slices but also to other raw foods, such as yams and plantains, and fabricated products derived from potato, corn, barley, wheat, rye, rice, oats, millet, and other starch-based grains.

FIG. 10 charts the results and operating conditions of yet another embodiment in which potato slices were washed, par-fried, and then oven-dried. A control sample 101 was processed in a manner similar to that described with respect to the base samples 71, 72 shown in FIG. 7*a*. After about a 20-30 second ambient-temperature water wash, followed by briefly contacting the potato slices with a dilute (3-5%) solution of sodium chloride for a few seconds, a control sample 101 of 1.45 mm thick slices of peeled Hermes chipping potatoes was par-fried in oil having an initial temperature of about 179° C. (354° F.) for approximately three minutes to 1.4% moisture by weight. The control sample 101 had an acrylamide concentration of 640 ppb, similar to the 630 ppb produced in the second base sample 72 shown in FIG. 7*a*. The test sample 102 was similarly washed and contacted like the control sample 101. Using a large commercial fryer, the test sample 102 was then par-fried in oil having an initial temperature of about 174° C. (345° F.) for about three minutes until the moisture content decreased to 2.5% by weight. The par-fried test sample 102 was then finish-dried for about six minutes using an oven at about 110° C. (230° F.) until the moisture level decreased to 1.4% by weight. Cooking in this manner produced product with a reduced acrylamide concentration of 160 ppb, which is roughly 25% of the acrylamide concentration of the control sample 101.

In yet another set of tests (not shown) similar to those shown in FIG. 10, potato slices underwent a standard wash procedure, were par-fried to about 3-5% moisture by weight, and then oven-dried to less than about 2% moisture by weight. A control sample was washed and then fried at about 179° C. (354° F.) to a finished moisture content of about 1.3% by weight, resulting in an acrylamide level of 380 ppb. However, par-frying test samples at about 179° C. (354° F.) to a moisture content of between about 3 to about 5% resulted in acrylamide levels of approximately 64 ppb. The par-fried product was then dried in a commercial Wenger oven at various temperatures. It was shown that drying the par-fried slices at about 115° C. (240° F.) to a final moisture content of about 1.3% moisture by weight in a Wenger oven resulted in acrylamide levels of 125 ppb. Interestingly, drying the par-fried slices at about 100° C. (212° F.) and under atmospheric or slightly less than atmospheric pressure (13.6 to 14.6 psia), even for extended periods of time (even as long as 10-15 minutes), did not increase the acrylamide levels. This embodiment demonstrates that potato slices can be par-fried at about 179° C. (354° F.) to a moisture content of between 3-5% and then oven-dried at about 100° C. (212° F.) under atmospheric or slightly below atmospheric pressure without increasing the acrylamide levels beyond what is formed in the par-frying operation. To further reduce the concentration of acrylamide formed in the cooked product, potato slices can be removed from the par-fry step with moisture levels as high as 10% by weight, but removing the product too soon can affect the final texture of the product. Note, however that this method is not limited to raw potato slices and can be applied to other fried food products such as fried tortillas, fried plantains, fried sweet potatoes, and fried yams. The advantage of par-frying and then oven-drying at about 100° C. (212° F.) is that the cooking unit operation alone can be modified to significantly reduce acrylamide formation from above 300 ppb to less than about 70 ppb; the standard peeling, slicing, and washing steps need not be modified.

In the set of embodiments involving par-frying followed by oven-drying, it is also possible to conduct the oven-drying under vacuum in order to enhance moisture removal. By oven-drying under vacuum, less time is required to dry the product to the desired final moisture content. Although it has been shown that oven-drying at or near 100° C. (212° F.) does not cause any measurable increase in acrylamide levels, oven-drying at that temperature takes a relatively long time to dry the product. Thus, vacuum oven-drying helps decrease the amount of time it takes for product to dry. It also helps decrease the amount of time the product is exposed to acrylamide-forming temperatures, should higher oven-drying temperatures be used.

While FIGS. 7a, 7b, 8, and 10 depicted test results from combining one particular embodiment of a modified cooking unit operation with several different embodiments of a modified washing unit operation comprising a contacting step, other embodiments and combinations are possible. For example, the various different contacting steps shown in those figures can instead be followed by a different modified cooking unit operation. Alternatively, an improved method for reducing acrylamide formation can simply utilize a modified cooking unit operation without modifying any of the other unit operations. In another set of embodiments of the invention, the second of the two heating steps of a modified cooking unit operation comprises vacuum finish-frying rather than atmospheric frying. By finish-frying under vacuum, the partially fried or cooked product emerging from the first heating step can continue to be fried, but at a temperature too low to form significant amounts of acrylamide. According to one embodiment, the vacuum pressure should be such that frying occurs below about 120° C. (250° F.). Such vacuum finish-frying can also be applied to other fried food products such as those derived from potato, corn masa, barley, wheat, rice, oats, millet, and other starch-based grains.

FIG. 11 charts the results and operating conditions of several examples of a modified cooking unit operation involving par-frying followed by vacuum finish-frying. In the control 110 and test samples 111, 112, 113, 114, Hermes variety of chipping potatoes were peeled, sliced to about 1.35 mm thickness, and subjected to a standard 20-to-30-second ambient-temperature water wash. After washing, the control sample 110 was fried at atmospheric pressure in oil having an initial temperature of about 177° C. (351° F.) for about 2.5 minutes to a moisture level of 0.83% by weight, producing an acrylamide concentration of 370 ppb. In Tests 1-4, all of the test samples 111, 112, 113, 114 were atmospheric par-fried at about 177° C. (351° F.) and vacuum finish-fried at about 120° C. (248° F.) and 100 millibars, but each was par-fried and vacuum finish-fried for different lengths of time. In Test 1 111, 220 ppb of acrylamide were found in the test sample after washing, atmospheric par-frying for about 100 seconds to 3% moisture by weight, and vacuum finish-frying for 44 seconds to about 0.7% moisture by weight. The results of Tests 2-4 112, 113, 114 show that acrylamide levels in the final product dramatically decrease when par-frying is stopped, and vacuum finish-drying is commenced, before the moisture content decreases to 3% by weight. Tests 2-4 112, 113, 114 all produced final acrylamide concentrations below 50 ppb. In Test 4 114, an acrylamide level of only 13 ppb was achieved by par-frying to 10% moisture by weight, then vacuum-frying to about 1% moisture by weight. As can be seen from the data, partially frying slices to higher moisture content before they are low-temperature vacuum finish-fried dramatically lowers final acrylamide concentrations. This method can also be used to reduce the final acrylamide concentrations in other fried products such as fried tortillas, fried plantains, fried sweet potatoes, and fried yams. The advantages of vacuum finish-frying after par-frying to about 3-10% moisture by weight are that the final stages of cooking can be completed at low temperatures without affecting product texture, and its effectiveness at reducing acrylamide formation can eliminate the need for a modified washing step comprising contacting the product with an aqueous solution. However, vacuum finish-frying also allows for the final stages of cooking to be completed at temperatures higher than those that can be used when not frying under a vacuum, while still providing a reduced acrylamide concentration in the finished product. It is noted that the vacuum finish-fried product had a lighter color than the control sample, and transferring cooking product from the par-frying operation to the vacuum finish-frying unit at higher moisture levels may impart a bland flavor to the product. It should be kept in mind that the capital cost of vacuum finish-frying equipment may be greater than that of oven-drying equipment.

Similarly, vacuum par-frying can be used in the first of the two heating steps of a modified cooking unit operation. As an example, one embodiment of a modified cooking unit operation involves vacuum par-frying to a moisture content near but above the threshold moisture level of 3-4% by weight, then oven-drying at no greater than about 120° C. (250° F.) to completion. By par-frying under vacuum, the product can be fried at lower temperature, thus producing less acrylamide. Furthermore, oven-drying at or below about 120° C. (250° F.) ensures that little to no additional acrylamide is formed during the oven-drying stage. The advantage of using vacuum par-frying in the first of the two heating steps, particularly when doing so below about 120° C. (250° F.) and even below about 140° C. (284° F.) when under vacuum, is that little to no acrylamide will be formed in the first step, whereas par-frying generally produces at least some level of acrylamide. However, vacuum-frying in the first heating step may create product with different finished characteristics.

For baked product lines, which can involve fabricated snacks or products such as cereals, cookies, crackers, hard pretzels, and bread, another embodiment of the invention comprises a modified cooking unit operation with a higher-temperature first baking step and a lower-temperature second baking step. In the cooking unit operation of this embodiment, the product is first baked at higher temperature (above about 120° C. (250° F.)) until its moisture content is reduced to about 4% to about 10% by weight. The product is then oven-dried (finish-dried or baked) at a temperature no greater than about 120° C. (250° F.) until the desired moisture level, typically about 1% to about 3% by weight, is attained. For example, a convection oven can be used in the higher-temperature first heating step to reduce product moisture content to about 10% by weight. The oven may be divided into four heating zones in which the temperature is highest in the first zone and gradually decreases through the remaining three zones. A downdraft, single zone, convection oven may be used in the lower-temperature second heating step to complete the cooking process. Other types of ovens, however, can be used for the two heating steps of this embodiment. Also, the lower-temperature second heating step of this particular embodiment, like that of the embodiments involving par-frying followed by oven-drying, can be performed at about 100° C. (212° F.) and slightly below atmospheric pressure so that little to no additional acrylamide is formed after the higher-temperature first heating step.

In tests using one example embodiment that involved a higher-temperature first baking step and a lower-temperature second baking step, fabricated potato pieces were first baked at a temperature above about 120° C. (250° F.) until the moisture levels decreased to approximately 10% by weight. The pieces were then finish-dried at about 110° C. (PC (230° F.) for about 10 minutes until the moisture content decreased to about 1.7-2.2% by weight. Final acrylamide levels of about 100-200 ppb were reported. However, when several samples of partially-baked pieces were finish-dried at about 120° C. (250° F.) to about 1.6% moisture by weight, acrylamide levels of between 470 and 750 ppb were reported. Furthermore, substantially higher acrylamide levels of between 460 and 1900 ppb were produced when samples of partially-baked slices were finish-fried at about 132° C. (270° F.) to about 1.6-2.2% moisture by weight. These results reemphasize the importance of keeping the cooking or drying temperature of a cooking product at or below about 120° C. (250° F.) during the final stages of cooking. This principle applies not only to the cooking of fabricated potato pieces but also to other fabricated products derived from potato, corn, barley, wheat, rye, rice, oats, millet, and other starch-based grains. This principle also applies to the cooking of raw foods such as yams and plantains.

In another embodiment of the invention, rather than dividing the modified cooking unit operation into a higher-temperature first heating step and a lower-temperature second heating step, the modified cooking unit operation instead comprises vacuum frying for the entire cooking process. FIG. 12 charts the results and operating conditions of several examples of such an embodiment. In Tests 1-4 121, 122, 123, 124, various control groups of peeled, sliced, 1.45 mm thick Hermes chipping potatoes were washed in ambient-temperature water for about 30 seconds, then processed through a standard continuous fryer. The fryer inlet oil temperature was varied within the range of about 165 to about 180° C. (329-356°), and the control samples were fried for about 3-4 minutes, resulting in acrylamide levels over 300 ppb. In contrast, the test samples in Tests 5-7 125, 126, 127 all produced acrylamide concentrations below 60 ppb after low-temperature vacuum frying for about 4 to about 10 minutes at temperatures ranging from about 100 to about 140° C. (212-284° F.) and pressures ranging from about 50 to about 100 millibars. As can be seen from the data, vacuum frying at reduced temperatures dramatically reduces the amount of acrylamide formed. Furthermore, little to no acrylamide is formed when the product is vacuum-fried below a temperature of about 120° C. (250° F.) throughout the entire cooking process. Tests 6 and 7 126, 127, for instance, show that vacuum frying under about 120° C. (250° F.) and at a pressure of no greater than 100 millibars results in virtually undetectable levels (less than 5 ppb) of acrylamide. The advantage of frying under about 120° C. (250° F.) is that little to no acrylamide is formed, whereas high-temperature par-frying causes at least some acrylamide to form. However, temperatures greater than about 120° C. (250° F.) can be used when vacuum frying or vacuum finish-frying is employed, while still achieving a reduced acrylamide concentration in the finished product. For example, in test 5 125, vacuum frying at about 140° C. (284° F.) produced a product with an acrylamide content of about 53 ppb. Given this result, it seems likely that vacuum finish frying or vacuum frying alone could produce products having less than about 100 ppb acrylamide at temperatures up to about 143° C. (290° F.). It should be kept in mind, however, that vacuum frying throughout the entire cooking process may significantly alter product texture, appearance, and flavor.

For baked product lines, which can involve fabricated snacks, cereals and other starch or dough-based products as explained above, the modified cooking unit operation can alternatively comprise low-temperature baking for the entire cooking process. Low-temperature baking can be performed at or below about 120° C. (250° F.) so that little to no acrylamide is formed. However, lower-temperature baking may create lighter-colored products, while higher-temperature baking may create darker-colored products. Thus, the applicability of low-temperature baking depends in part on the desired color characteristics of the final product.

This invention contemplates combining the teachings herein with regard to various unit operation manipulations in order to achieve a desired acrylamide level in the end product along with the desired end-product characteristics. The combinations used depend on the starting product and the desired end product and can be adjusted by one skilled in the art pursuant to the teachings herein. The effect of pH on acrylamide formation is another factor that may be considered and combined with the teachings herein.

It should be understood that changes in the characteristics of the final product, such as changes in color, taste, and consistency can be adjusted by various means. For example, color characteristics in potato chips can be adjusted by controlling the amount of sugars in the starting product. Some flavor characteristics can be changed by the addition of various flavoring agents to the end product. The physical texture of the product can be adjusted by, for example, the addition of leavening agents or various emulsifiers.

While the invention has been particularly shown and described with reference to one or more embodiments, it will be understood by those skilled in the art that various approaches to the reduction of acrylamide in thermally processed foods may be made without departing from the spirit and scope of this invention. For example, while the process has been disclosed herein with regard to potato products, the process can also be used in processing of food products made from corn, barley, wheat, rye, rice, oats, millet, and other starch-based grains. In addition to potato chips, the invention can be used in making corn chips and other types of snack chips, as well as in cereals, cookies, crackers, hard pretzels, breads and rolls, and the breading for breaded meats. In each of these foods, the present invention's method for manipulating one or more unit operations can be combined with other strategies for the reduction of acrylamide to produce an acceptable acrylamide level without adversely affecting the taste, color, odor, or other characteristics of an individual food.

We claim:

1. A method of reducing asparagine in a food product comprising the steps of:
   (a) continuously providing an untreated food feed, said food feed comprising a first concentration of asparagine and starch;
   b) leaching asparagine out of said untreated food feed with an asparagine-deficient potato extract, thereby forming:
      a post-wash extract containing asparagine and having excess unbound starch, and
      a treated food stream having a second concentration of asparagine that is less than said first concentration;
   (c) removing excess unbound starch with a starch removal unit and removing asparagine from said post-wash extract with at least one asparagine removal unit, thereby regenerating said asparagine-deficient food extract;
   (d) reusing said asparagine-deficient food extract in step (b).

2. The method of reducing asparagine in a food product of claim 1 wherein said leaching of step (b) further comprises counter-current leaching.

3. The method of reducing asparagine in a food product of claim 1 wherein step (b) is performed using a screw-type extractor.

4. The method of reducing asparagine in a food product of claim 1 wherein step (b) is performed using a wash-tank type extractor.

5. The method of reducing asparagine in a food product of claim 1 wherein step (b) is performed using a Bollman-type percolation extractor.

6. The method of reducing asparagine in a food product of claim 1 wherein said asparagine-deficient food extract and said untreated food feed are in equilibrium with each other with respect to the concentrations of water-soluble matter other than asparagine.

7. The method of reducing asparagine in a food product of claim 1 wherein step (c) further comprises percolating said post-wash extract through an extraction column filled with an ion exchange resin.

8. The method of reducing asparagine in a food product of claim 1 wherein step (c) further comprises percolating said post-wash extract through an extraction column filled with an immobilized asparaginase resin.

9. The method of claim 8 further comprising the step of removing ammonia from said asparagine-deficient food extract.

10. The method of claim 1 wherein an effective amount of asparaginase is added to said post-wash extract at step c) such that said asparagine-deficient food extract comprises less than about 50% of the asparagine concentration in said post-wash extract.

11. The method of claim 10 further comprising the step of removing ammonia from said asparagine-deficient food extract.

12. The method of claim 1 wherein said treated food stream comprises food slices and wherein said food slices are par-fried in cooking oil having a temperature above about 120° C. until said food slices have a moisture content of between about 3% by weight and about 10% by weight thereby forming a plurality of par-fried food slices, and
   cooking said par-fried food slices at less than about 120° C. until said par-fried food slices have a final moisture content ranging from about 1% by weight to about 2% by weight thereby forming a plurality of food chips having a reduced acrylamide concentration.

13. A method of reducing asparagine in a food product comprising the steps of:
   (a) continuously providing a substantially untreated food feed wherein said untreated food feed contains asparagine;
   (b) leaching asparagine out of said untreated food feed with an asparagine-deficient food extract, thereby forming a post-wash extract containing asparagine and a treated food stream having reduced levels of asparagine.
   (c) removing asparagine from said post-wash extract with at least one asparagine removal unit thereby forming an asparagine-deficient food extract;
   (d) removing at least one reaction product selected from the group consisting of ammonia and aspartic acid from said asparagine-deficient food extract.

14. The method of reducing asparagine in a food product of claim 13 wherein said untreated food feed further contains starch, step (b) further comprises leaching starch out of said untreated food feed with said stream of pure water.

15. The method of reducing asparagine in a food product of claim 13 wherein step (d) is performed using an aspartic acid removal unit.

16. The method of reducing asparagine in a food product of claim 13 wherein step (d) is performed using an ammonia removal unit.

17. The method of reducing asparagine in a food product of claim 16 wherein said ammonia unit further comprises a sorbent.

18. The method of reducing asparagine in a food product of claim 15 wherein said reaction product is removed with an ion exchange resin.

19. The method of reducing asparagine in a food product of claim 13 wherein said ammonia is removed by one or more removal methods selected from heating said asparagine-deficient food extract, reducing pressure of the asparagine-deficient food extract, and bubbling a gas through said asparagine-deficient food extract.

20. The method of reducing asparagine in a food product of claim 13 wherein said reaction product is removed by adjusting a pH of said asparagine-deficient food extract.

21. The method of reducing asparagine in a food product of claim 13 wherein said aspartic acid is removed with an ultra-filtration membrane.

22. The method of reducing asparagine in a food product of claim 13 wherein step (c) further comprises percolating said post-wash extract through an extraction column filled with an ion exchange resin.

23. The method of claim 22 further comprising the step of removing ammonia from said asparagine-deficient food extract.

24. The method of reducing asparagine of claim 13 wherein the removal unit at step c) comprises post wash extract and an asparagine-deficient food extract wherein step c) further comprises adding an effective amount of asparaginase such that said asparagine-deficient food extract comprises less than about 50% of the asparagine concentration in said post-wash extract.

25. The method of claim 24 further comprising the step of removing ammonia from said asparagine-deficient food extract.

26. The method of claim 13 wherein said treated food stream comprises food slices and wherein said food slices are par-fried in cooking oil having a temperature above about 120° C. until said food slices have a moisture content of between about 3% by weight and about 10% by weight thereby forming a plurality of par-fried food slices, and cooking said par-fried food slices at less than about 120° C. until said par-fried food slices have a final moisture content ranging from about 1% by weight to about 2% by weight thereby forming a plurality of food chips having a reduced acrylamide concentration.

27. The method of claim 13 wherein said leaching at step b) occurs for at least 15 minutes.

28. The method of claim 13 wherein said asparagine-deficient food extract is heated to a temperature of between about 100° F. and about 150° F.

29. The method of claim 13 wherein said asparagine-deficient food extract at step b) comprises between about 0.5 grams and about 2 grams of a raw potato per 1 mL of added solution.

30. The method of claim 13 wherein said asparagine-deficient food extract comprises between about 3000 units to about 100,000 units of asparaginase per 1.4 liters of said asparagine-deficient food extract.

31. The method of claim 1 wherein said leaching at step b) occurs for at least 15 minutes.

32. The method of claim 1 wherein said asparagine-deficient food extract is heated to a temperature of between about 100° F. and about 150° F.

33. The method of claim 1 wherein said asparagine-deficient food extract at step b) comprises between about 0.5 grams and about 2 grams of a raw food per 1 mL of added solution.

34. The method of claim 1 wherein said asparagine-deficient food extract comprises between about 3,000 units to about 100,000 units of asparaginase per kilogram of a raw food used to make said asparagine deficient food extract.

35. The method of claim 1 wherein said food ingredient comprises a sliced food ingredient.

36. The method of claim 35 wherein said sliced food ingredient comprises potato.

37. The method of claim 1 wherein said food ingredient comprises French fries.

38. The method of claim 1 comprising one or more food ingredients selected from rice, wheat, corn, barley, soy, oats, and roasted cacao beans.

* * * * *